US011982109B2

(12) United States Patent
Lehner, Jr. et al.

(10) Patent No.: US 11,982,109 B2
(45) Date of Patent: May 14, 2024

(54) EXIT DEVICE FORCE ADJUSTMENT MECHANISMS

(71) Applicant: Schlage Lock Company LLC, Carmel, IN (US)

(72) Inventors: Jack R. Lehner, Jr., Indianapolis, IN (US); Paul R. Arlinghaus, Fishers, IN (US); Aaron P. McKibben, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 1074 days.

(21) Appl. No.: 15/976,159

(22) Filed: May 10, 2018

(65) Prior Publication Data

US 2018/0258667 A1 Sep. 13, 2018

Related U.S. Application Data

(62) Division of application No. 14/713,624, filed on May 15, 2015, now Pat. No. 10,072,444.

(51) Int. Cl.

| | |
|---|---|
| ***E05B 65/10*** | (2006.01) |
| ***E05B 15/04*** | (2006.01) |
| ***E05F 11/54*** | (2006.01) |

(52) U.S. Cl.
CPC .......... *E05B 65/1053* (2013.01); *E05F 11/54* (2013.01); *E05B 2015/0431* (2013.01)

(58) Field of Classification Search
CPC .......... E05B 65/1053; E05B 2015/0431; E05F 11/54; Y10T 292/0901; Y10T 292/0908; Y10T 292/0909; Y10T 292/091; Y10T 292/0969; Y10T 292/0972; Y10T 292/0977; Y10T 292/0976; Y10S 292/65
See application file for complete search history.

(56) References Cited

U.S. PATENT DOCUMENTS

| | | | | |
|---|---|---|---|---|
| 2,715,542 | A | | 8/1955 | Gould |
| 3,854,763 | A | | 12/1974 | Zawadzki et al. |
| 4,796,931 | A | | 1/1989 | Heid |
| 4,801,163 | A | * | 1/1989 | Miller ................ E05B 65/1073 292/92 |
| 5,011,199 | A | | 4/1991 | Lowe et al. |
| 5,033,234 | A | | 7/1991 | Simon et al. |
| 5,085,475 | A | | 2/1992 | Austin et al. |
| 5,372,394 | A | | 12/1994 | Salter et al. |
| 5,412,961 | A | | 5/1995 | Cain et al. |
| 5,446,944 | A | | 9/1995 | Coleman et al. |
| 5,634,297 | A | | 6/1997 | Ito |
| 5,765,883 | A | | 6/1998 | Dessenberger et al. |
| 5,864,986 | A | | 2/1999 | Schnarr |
| 5,901,992 | A | | 5/1999 | Winkler |
| 6,116,661 | A | | 9/2000 | Overbey et al. |
| 6,854,773 | B2 | | 2/2005 | Lin |
| 6,945,573 | B2 | | 9/2005 | Ruiz et al. |

(Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

A force adjustment mechanism configured for use with an exit device including a pushbar having an extended position and a retracted position. With the pushbar in the extended position, the pushbar resists movement toward the retracted position with a net resistive force. The force adjustment mechanism is operable to adjust the net resistive force.

26 Claims, 17 Drawing Sheets

(56) References Cited

U.S. PATENT DOCUMENTS

| | | | | |
|---|---|---|---|---|
| 7,234,201 | B2 | 6/2007 | Brown et al. | |
| 7,469,942 | B2 | 12/2008 | Whitaker et al. | |
| 8,042,843 | B2 | 10/2011 | Tien | |
| 8,182,003 | B2 * | 5/2012 | Dye | E05B 65/1053 292/216 |
| 8,201,857 | B2 | 6/2012 | Tien | |
| 8,267,441 | B2 * | 9/2012 | Lin | E05B 53/00 292/92 |
| 8,407,937 | B2 | 4/2013 | Houser | |
| 8,495,836 | B2 * | 7/2013 | Lowder | E05B 65/1053 49/394 |
| 8,528,946 | B2 | 9/2013 | Shen | |
| 8,544,897 | B2 * | 10/2013 | Tien | E05B 65/104 292/92 |
| 8,851,530 | B2 * | 10/2014 | Geringer | E05B 47/0012 292/201 |
| 9,580,944 | B2 | 2/2017 | Arlinghaus et al. | |
| 10,072,444 | B2 * | 9/2018 | Lehner, Jr. | E05B 65/1053 |
| 10,577,832 | B2 * | 3/2020 | Blanchard | E05B 65/1053 |
| 11,035,150 | B2 * | 6/2021 | Brennan | E05B 65/108 |
| 2005/0104381 | A1 | 5/2005 | Whitaker et al. | |
| 2008/0012350 | A1 * | 1/2008 | Condo | E05B 65/1093 292/92 |
| 2008/0295550 | A1 * | 12/2008 | Schmidt | E05B 65/10 70/144 |
| 2009/0145179 | A1 * | 6/2009 | Chen | E05B 13/004 70/107 |
| 2010/0007154 | A1 * | 1/2010 | Schacht | E05B 65/1053 292/92 |
| 2010/0026012 | A1 * | 2/2010 | Lin | E05B 65/1053 292/92 |
| 2010/0043505 | A1 * | 2/2010 | Tien | E05B 65/1053 70/92 |
| 2010/0045053 | A1 * | 2/2010 | Dye | E05B 65/1053 292/201 |
| 2011/0239712 | A1 * | 10/2011 | Tien | E05B 63/0056 70/92 |
| 2012/0032455 | A1 * | 2/2012 | Lin | E05B 17/0041 292/92 |
| 2012/0242092 | A1 | 9/2012 | Frolov et al. | |
| 2014/0109479 | A1 | 4/2014 | Morstatt et al. | |
| 2015/0137528 | A1 * | 5/2015 | Geringer | E05B 47/0012 292/144 |
| 2015/0167354 | A1 * | 6/2015 | Tien | E05B 65/1046 292/92 |
| 2015/0184426 | A1 * | 7/2015 | Arlinghaus | E05B 15/004 292/138 |
| 2016/0115719 | A1 | 4/2016 | Coleman et al. | |
| 2016/0333621 | A1 * | 11/2016 | Lehner, Jr. | E05B 65/1053 |
| 2017/0102058 | A1 * | 4/2017 | Stephenson | F16H 25/2214 |
| 2018/0119456 | A1 * | 5/2018 | Blanchard | E05B 65/1053 |
| 2018/0245375 | A1 * | 8/2018 | Arlinghaus | E05B 81/77 |

* cited by examiner

EXIT DEVICE FORCE ADJUSTMENT MECHANISMS

CROSS-REFERENCE TO RELATED APPLICATIONS

The present application is a divisional of U.S. patent application Ser. No. 14/713,624 filed May 15, 2015, the contents of which are incorporated herein by reference in their entirety.

TECHNICAL FIELD

The present application generally relates to force adjustment mechanisms for exit devices, and more particularly, but not exclusively, to exit devices including such force adjustment mechanisms.

BACKGROUND

Exit devices are occasionally used to allow egress through an exit door. Certain exit devices include a pushbar which retracts a latchbolt when actuated, thereby allowing the door to be opened. Some such systems have certain limitations such as, for example, failing to provide for customization and/or adjustment of operating parameters. Therefore, a need remains for further improvements in this area of technology.

SUMMARY

An exemplary force adjustment mechanism is configured for use with an exit device including a pushbar having an extended position and a retracted position. With the pushbar in the extended position, the pushbar resists movement toward the retracted position with a net resistive force. The force adjustment mechanism is operable to adjust the net resistive force. Further embodiments, forms, features, and aspects of the present application shall become apparent from the description and figures provided herewith.

DETAILED DESCRIPTION OF ILLUSTRATIVE EMBODIMENTS

Figure 1:
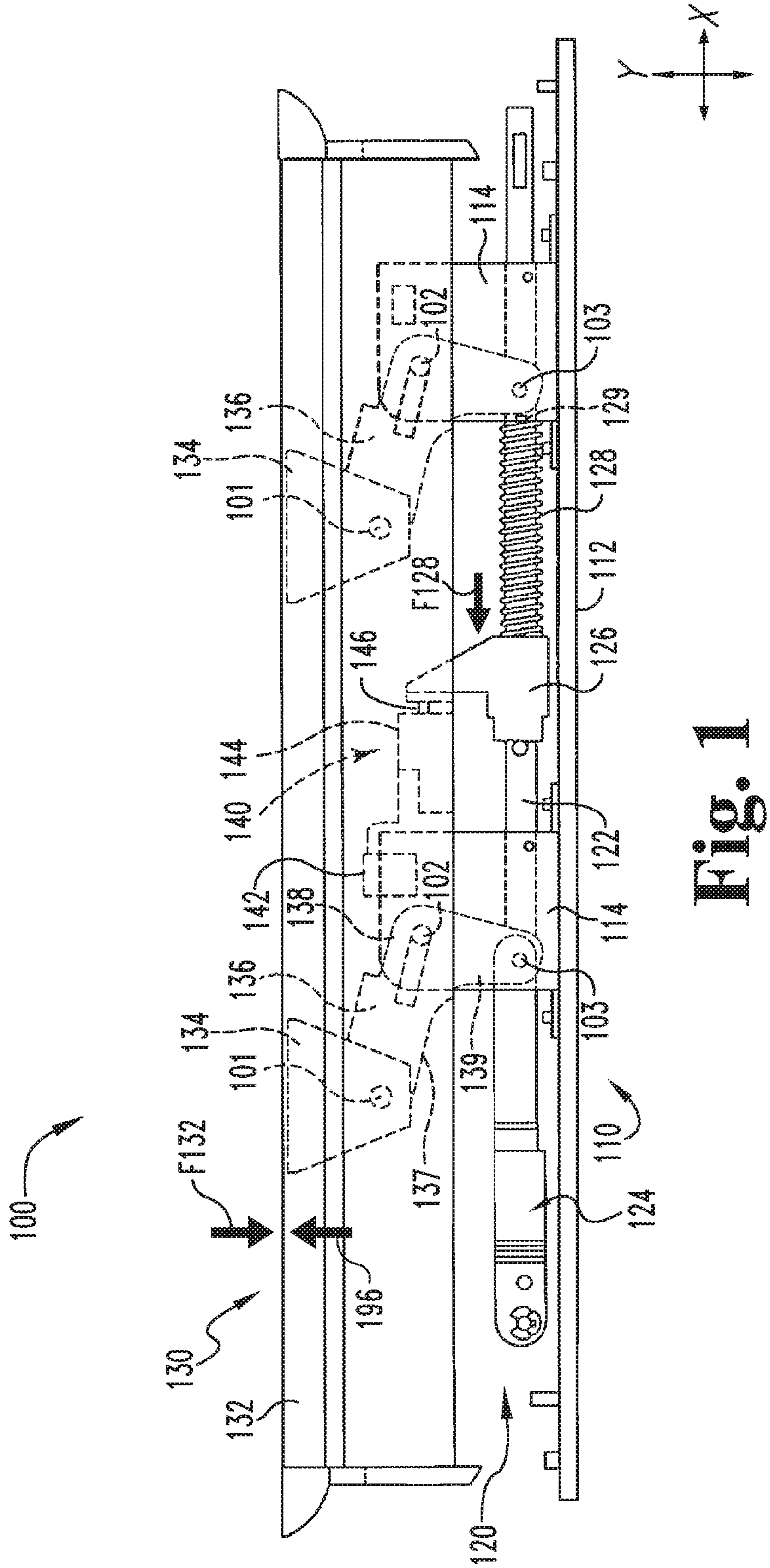
FIG. 1 illustrates an exit device usable with force adjustment mechanisms according certain embodiments.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms “longitudinal”, “lateral”, and “transverse” are used to denote motion or spacing along or substantially along three mutually perpendicular axes. In the coordinate plane illustrated in the Figures, the X-axis defines the longitudinal directions, including proximal and distal directions, the Y-axis defines the lateral directions, and the Z-axis defines the transverse directions. While the illustrated longitudinal and lateral directions are horizontal directions and the illustrated transverse direction is a vertical direction, these terms are used for ease of convenience and description, and are without regard to the orientation of the system with respect to the environment. For example, descriptions that reference a longitudinal direction may be equally applicable to a vertical direction, a horizontal direction, or an off-axis orientation with respect to the environment. Additionally, motion or spacing along one direction need not preclude motion or spacing along another of the directions. For example, elements which are described as being “laterally offset” from one another may also be offset in the longitudinal and/or transverse directions, or may be aligned in the longitudinal and/or transverse directions. The terms are therefore not to be construed as limiting the scope of the subject matter described herein.

Figure 2:
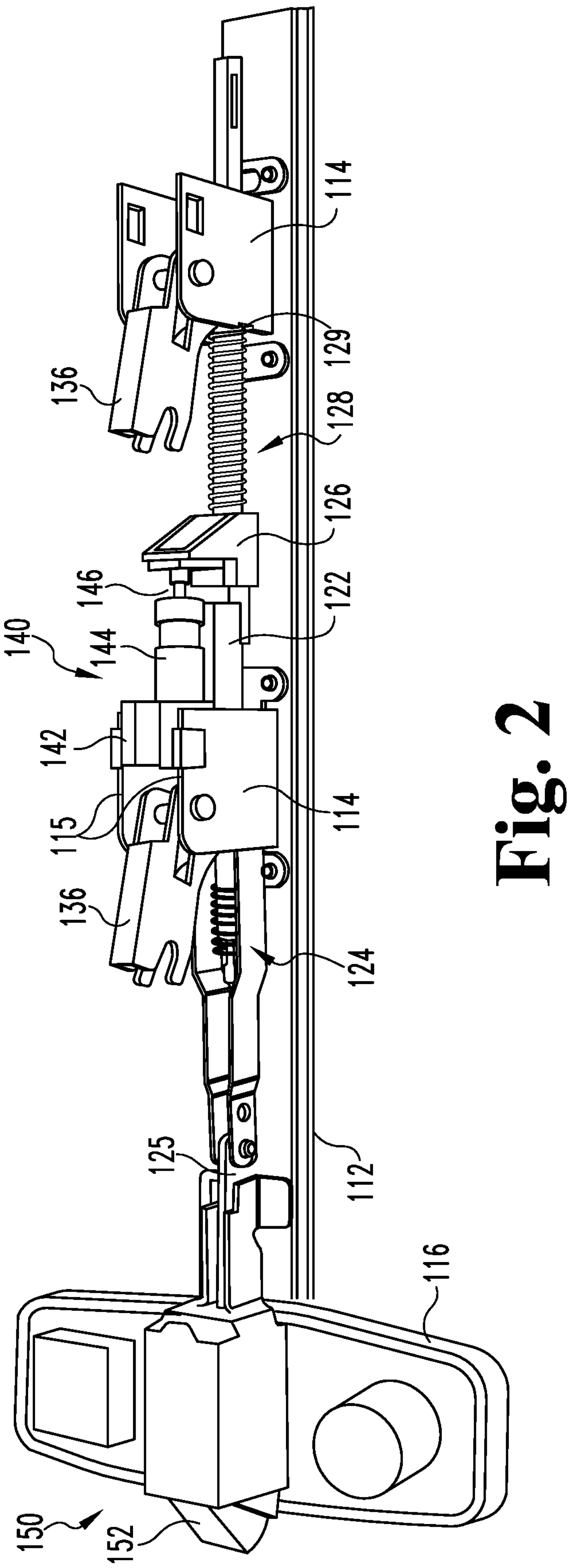
FIG. 2 is a perspective illustration of a portion of the exit device depicted in FIG. 1.

With reference to FIGS. 1 and 2, an exit device 100 which may be utilized in certain embodiments generally includes a mounting assembly 110 configured for mounting on a surface of a door, and a drive assembly 120 supported on the mounting assembly 110. The drive assembly 120 has an extended state and a retracted state, and includes a pushbar assembly 130 operable to transition the drive assembly 120 between the extended and retracted states. The exit device

100 may further include a damper assembly 140 selectively engaged with the drive assembly 120, and/or a latchbolt mechanism 150 operatively coupled with the drive assembly 120. As described in further detail below, the latchbolt mechanism 150 includes a latchbolt 152, and the drive assembly 120 retracts the latchbolt 152 in response to actuation of the pushbar assembly 130.

The mounting assembly 110 generally includes a base plate 112 configured for mounting on a door, and a pair of mounting brackets 114 coupled to the base plate 112. Each of the mounting brackets 114 includes a pair of transversely spaced walls 115, which extend laterally away from the base plate 112. The mounting assembly 110 may further include a header plate 116, on which the latchbolt mechanism 150 may be mounted.

The drive assembly 120 generally includes a drive bar 122, a fork link 124 coupled to a proximal end of the drive bar 122, a collar 126 including a laterally-extending arm 127 and coupled to the drive bar 122, and a biasing element urging the drive assembly 120 toward the extended state. While other forms are contemplated, the illustrated biasing element is a main compression spring 128 through which the drive bar 122 extends. The drive assembly 120 may also include a link bar 125 coupling the drive assembly 120 to the latchbolt mechanism 150. The drive bar 122 is longitudinally movable in a proximal direction (to the left in FIGS. 1 and 2) and a distal direction (to the right in FIGS. 1 and 2).

Movement of the drive bar 122 is transmitted via the fork link 124 and the link bar 125 to the latchbolt mechanism 150. More specifically, movement of the drive bar 122 in the proximal or extending direction causes the latchbolt 152 to extend toward a latching position, and movement of the drive bar 122 in the distal or retracting direction causes the latchbolt 152 to retract toward an unlatching position. As such, the proximal direction may be considered a bolt-extending direction, and the distal direction may be considered a bolt-retracting direction.

In the illustrated form, the main spring 128 is compressed between the collar 126 and the distal mounting bracket 114. More specifically, the proximal end of the compression spring 128 is engaged with the collar 126, and the distal end of the compression spring 128 is engaged with the distal mounting bracket 114 through a washer 129. The distal mounting bracket 114 acts as an anchor for the washer 129, such that the compressed spring 128 exerts a main spring biasing force F128 on the collar 126. The biasing force F128 is an extensive biasing force urging the drive assembly 120 toward the extended state. In other forms, an extensive biasing force may be exerted on the drive assembly 120 in another manner.

The drive assembly 120 also includes a pushbar assembly 130, which generally includes a manually-actuable pushbar 132, a pair of pushbar brackets 134 coupled to the pushbar 132, and a pair of bell cranks 136 coupling the pushbar 132 with the drive bar 122. The pushbar 132 is laterally movable between an extended position and a retracted position. As described in further detail below, the bell-cranks 136 translate lateral movement of the pushbar 132 to longitudinal movement of the drive bar 122. Each of the bell cranks 136 includes a first arm 137, a center portion 138, and a second arm 139 angularly offset from the first arm 137. Each of the first arms 137 is pivotally connected to one of the pushbar brackets 134 by a first pivot pin 101, each of the center portions 138 is pivotally connected to one of the mounting brackets 114 by a second pivot pin 102, and each of the second arms 139 is pivotally connected to the drive bar 122 by a third pivot pin 103.

The damper assembly 140 includes a body 142 coupled to the proximal mounting bracket 114, a body 144 coupled to the body 142, and a plunger 146 extending from the body 144 toward the arm 127 of the collar 126. The body 142 houses a spring which biases the plunger 146 in the distal direction (i.e. toward the arm 127), and a viscous fluid which resists movement of the plunger 146 in both the proximal and distal directions. Such damper assemblies are known in the art, and need not be further described herein.

During operation of the exit device 100, a user manually actuates the drive assembly 120 by exerting an actuating force F132 sufficient to move the pushbar 132 from the extended position to the retracted position. As the pushbar 132 moves laterally inward (i.e. toward the base plate 112), the bell cranks 136 pivot about the pins 102 in the counter-clockwise direction (as viewed in FIG. 1). As the bell cranks 136 pivot, the second arms 139 urge the drive bar 122 in the distal or retracting direction against the biasing force of the spring 128, thereby causing the latchbolt 152 to retract. As the collar 126 moves with the drive bar 122, the spring of the damper assembly 140 urges the plunger 146 in the distal direction. Due to the viscous fluid in the body 144, however, the plunger 146 may travel more slowly than the collar 126, such that the plunger 146 lags behind the arm 127. As such, the damper assembly 140 does not necessarily materially affect the actuating force F132 required to move the pushbar 132 from the extended position to the depressed position.

When the actuating force F132 is removed from the pushbar 132, the compressed spring 128 urges the drive bar 122 in the proximal or bolt-extending direction, causing the latchbolt 152 to extend. As the drive bar 122 moves in the bolt-extending direction, the bell cranks 136 pivot about the center portions 138 in the illustrated clockwise direction (as viewed in FIG. 1), thereby urging the pushbar 132 toward the extended position thereof. Additionally, as the drive bar 122 moves in the bolt-extending direction, the collar 126 engages the plunger 146, and the viscous fluid in the body 144 resists movement of the collar 126 in the bolt-extending direction. The damper assembly 140 thus reduces the speed of the drive assembly 120, pushbar assembly 130, and latchbolt mechanism 150, mitigating shock damage that may otherwise occur.

As noted above, the main spring 128 is preloaded or compressed between the collar 126 and the distal mounting bracket 114, such that a proximal biasing force F128 is provided to the drive bar 122. This proximal biasing force F128 urges the drive assembly 120 toward the extended state, and thus may be considered an extensive biasing force on the drive assembly 120. The main spring force F128 contributes to an extensive biasing force, which in turn contributes to a net force biasing the drive assembly 120 toward the extended state. It is to be appreciated that the exit device 100 may also include additional springs exerting extensive forces on the drive assembly 120, such as a spring urging the latchbolt 152 toward the extended or latching position.

With the drive assembly 120 in the extended state, the pushbar 132 is in an extended position, and resists movement toward the retracted position with a net resistive force 196. The net resistive force 196 corresponds to the net force biasing the drive assembly 120 toward the extended state. Thus, in order to transition the drive assembly 120 from the extended state to the retracted state, a user must exert on the pushbar 132 an actuating force F132 sufficient to overcome the net resistive force 196.

In certain circumstances, it may be desirable to adjust the actuating force F132 required to depress the pushbar 132. In such a case, an exit device such as the exit device 100 may include a force adjustment mechanism operable to adjust the net resistive force 196. Exemplary forms of force adjustment mechanisms are described below with reference to FIGS. 3-18. Each of the force adjustment mechanisms is operable to selectively provide the exit device 100 with each of at least two actuating forces F132. For example, a force adjustment mechanism may have a plurality of configurations, each of which may provide the exit device with a different net resistive force, and therefore a different actuating force F132. In one of the configurations, the force adjustment mechanism may provide the exit device 100 with a net resistive force corresponding to an eight-pound (8 lbf) actuating force F132. In another of the configurations, the force adjustment mechanism may provide the exit device 100 with a net resistive force corresponding to a five-pound (5 lbf) actuating force F132. Additional or alternative configurations may provide the exit device 100 with net resistive forces corresponding to additional or alternative values of the actuating force F132.

While the following descriptions are made with reference to the exit device 100 and elements and features thereof, it is to be understood that at least some of the force adjustment mechanisms may be utilized in combination with exit devices of other configurations. Additionally, at least some of the force adjustment mechanisms need not be included in an exit device at the time of sale. For example, certain force adjustment mechanisms may be configured for use with a particular configuration of exit device, and may be manufactured and sold as a retrofit kit for such exit devices.

In certain embodiments, a force adjustment mechanism may include a counterbalance spring exerting a retractive biasing force which detracts from or decreases the net biasing force and the net resistive force 196. Exemplary forms of such force adjustment mechanisms are described below with reference to the force adjustment mechanisms 200, 300, 600', 900, 1100, and the embodiment of the force adjustment mechanism 800 illustrated in FIG. 17. In other embodiments, a force adjustment mechanism may be operable to adjust the net resistive force 196 by adjusting the extensive biasing force F128 provided by the spring 128. Exemplary forms of such force adjustment mechanisms are described below with reference to the force adjustment mechanisms 400, 500, and 700. In further embodiments, a force adjustment mechanism may include a supplemental spring exerting a second extensive biasing force which contributes to or increases the net biasing force. Exemplary forms of such force adjustment mechanisms are illustrated and described below with reference to the force adjustment mechanism 600, and the embodiment of the force adjustment mechanism 800 illustrated in FIG. 15.

As will be appreciated, the biasing force provided by a spring corresponds to the distance by which the spring has been deformed from its equilibrium or natural state. The amount of deformation will be referred to herein generally as the deformation displacement. Generally speaking, the greater the deformation displacement, the greater the biasing force provided by the spring. Depending upon the type of spring, the deformation displacement may be provided in a number of forms. For example, the deformation displacement may be a compression displacement for compression springs, an extension displacement for extension springs, or a torsion displacement for torsion springs.

In various forms, the force adjustment mechanisms may be operable to adjust the biasing forces exerted by a spring by adjusting the deformation displacement thereof. For example, the force adjustment mechanism may be used adjust an extensive biasing force of a supplemental spring or the main spring 128, and/or to adjust a retractive biasing force provided by a counterbalance spring. As noted above, the net resistive force 196 depends upon the extensive biasing force and, when present, the retractive biasing force. As such, the actuating force F132 can be varied by adjusting any of the main spring force, the supplemental spring force, and the counterbalance spring force.

With reference to FIGS. 3-6, illustrated therein is a force adjustment mechanism 200 according to one embodiment. The force adjustment mechanism 200 generally includes a housing 210 configured for mounting in an exit device, an adjustment bolt 220 rotatably coupled to the housing 210, a sleeve 230 through which the adjustment bolt 220 extends, a longitudinally movable link 240 supporting the sleeve 230, and a counterbalance spring 250 engaged with the sleeve 230 and the link 240.

The illustrated housing 210 generally includes a longitudinally extending ceiling 212, a pair of transversely-spaced arms 214 extending laterally inward from a distal portion of the ceiling 212, and a flange 216 extending laterally inward from a proximal end of the ceiling 212. The housing 210 is sized and configured to be mounted in the distal mounting bracket 114, such that each of the arms 214 is adjacent one of the walls 115 of the mounting bracket 114.

The adjustment bolt 220 includes a proximal end 222, a distal end 224, and a threaded portion 226 extending therebetween. The proximal end 222 of the adjustment bolt 220 may be supported by the housing 210. For example, a bearing or bushing 202 may be seated in an opening formed in the flange 216, and the adjustment bolt proximal end 222 may be supported by the bushing 202. The distal end 224 may include features which facilitate rotation of the adjustment bolt 220 by an appropriate tool, such as an Allen wrench or screwdriver.

The sleeve 230 generally includes an enlarged proximal end 232 and a substantially cylindrical body portion 234 extending distally from the proximal end 232. The proximal end 232 has a dimension greater than the inner diameter of the spring 250, and provides an anchor point for the proximal end of the spring 250. The body portion 234 extends through the coils of the spring 250, and may have an outer diameter corresponding to the inner diameter of the spring 250. The sleeve 230 is hollow, and includes an internally threaded portion 236 engaged with the externally threaded portion 226 of the adjustment bolt 220. Engagement between the threaded portions 226, 236 causes the sleeve 230 to move longitudinally in response to rotation of the adjustment bolt 220. The sleeve 230 may also include anti-rotation features which discourage the sleeve 230 from rotating along with the adjustment bolt 220. For example, the proximal end 232 may extend laterally toward the ceiling 212. In such embodiments, the ceiling 212 may engage the edge of the proximal end 232 to prevent rotation of the sleeve 230 with respect to the housing 210, thereby ensuring that rotation of the adjustment bolt 220 results in longitudinal movement of the sleeve 230.

The link 240 is slidably mounted in the mounting bracket 114, and transmits the biasing force of the spring 250 to the drive bar 122. In the illustrated form, the link 240 includes a distal wall 242 engaged with the spring 250, and a proximal hook 246 engaged with the bell crank 136, for example via the pin 103 which pivotably links the bell crank 136 to the drive bar 122. The spring 250 may be preloaded or compressed between the wall 242 and the enlarged portion 232 of the sleeve 230, such that the spring 250 exerts a spring force F250 on the link 240. The link 240 in turn transmits the spring force F250 to the pin 103, urging the bell crank 136 and the drive bar 122 in the bolt-retracting direction.

Figures 3, 4:
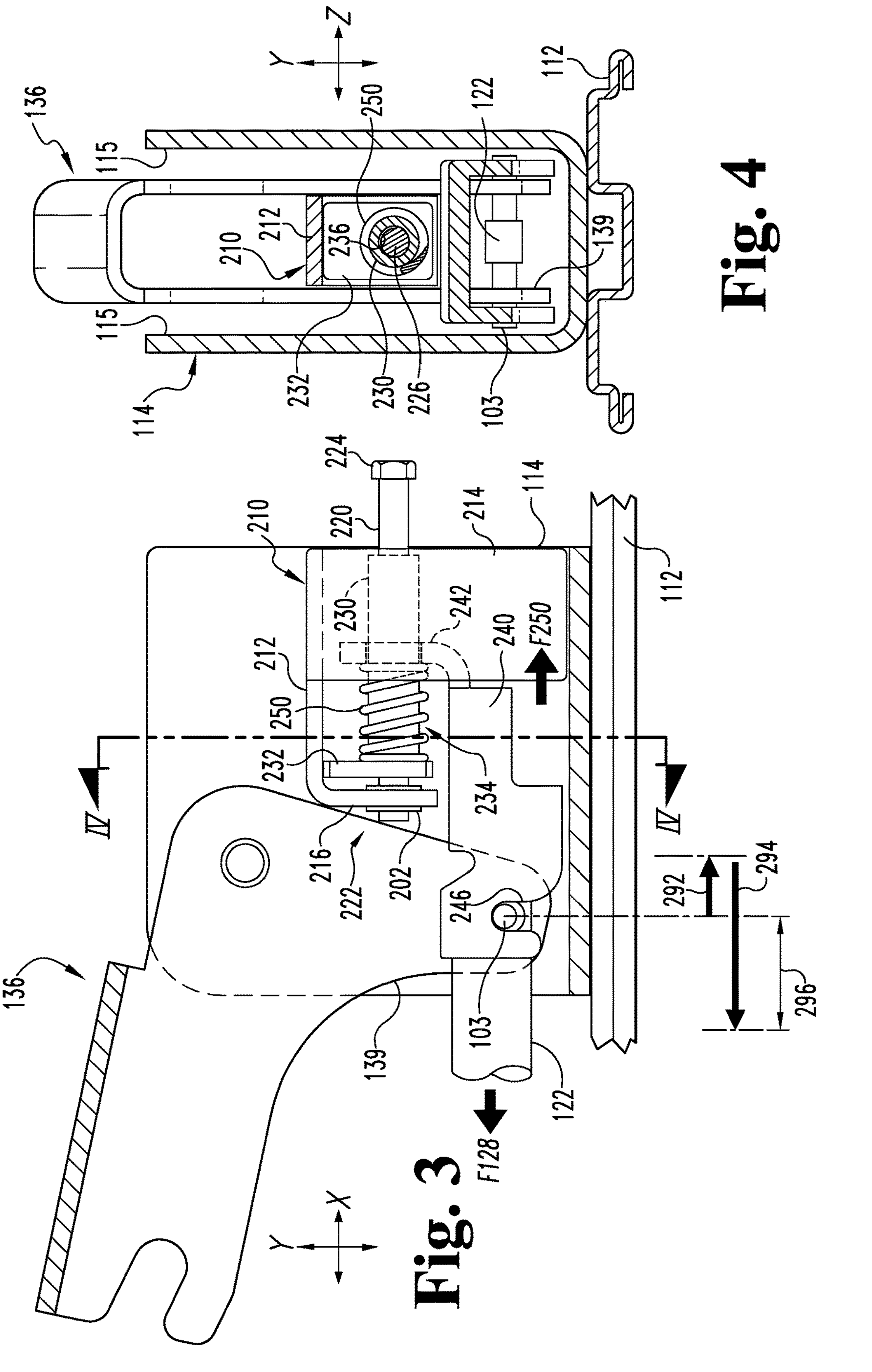
FIG. 3 illustrates a force adjustment mechanism according to one embodiment in a first configuration, and a portion of an exit device in an extended state.
FIG. 4 is a cross-sectional illustration of the force adjustment mechanism and exit device illustrated in FIG. 3, taken along cut line IV-IV.
Figure 5:
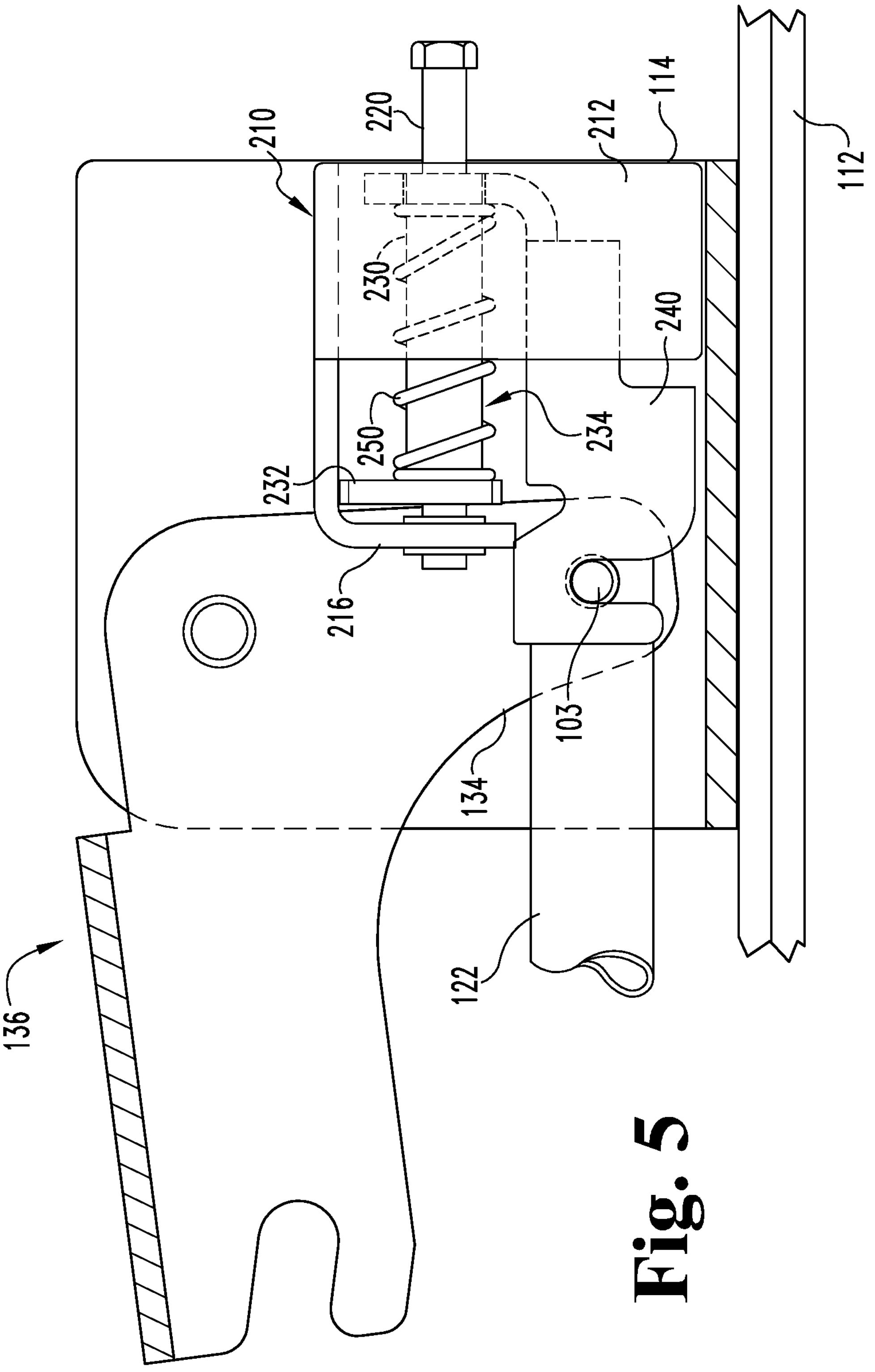
FIG. 5 illustrates the force adjustment mechanism illustrated in FIG. 3 in the first configuration, with the exit device in a retracted state.

With specific reference to FIG. 3, the force F250 provided by the counterbalance spring 250 contributes to a retractive biasing force 292 urging the drive assembly 120 toward the retracted state. As noted above, the main spring 128 urges the drive bar 122 in the bolt-extending direction with a force F128, which contributes to an extensive biasing force 294 urging the drive assembly 120 toward the extended state. The extensive biasing force 294 is partially countered by the retractive biasing force 292, resulting in a net biasing force 296 urging the drive assembly 120 toward the extended state. As will be appreciated, the net resistive force 196 corresponds to the net biasing force 296. As such, the retractive biasing force 292, including the counterbalance spring force F250, may be considered as detracting from the net biasing force 296 and/or the net resistive force 196. Contrastingly, the extensive biasing force 294, including the main spring force F128, may be considered as contributing to the net biasing force 296 and/or the net resistive force 196.

As a result of the retractive biasing force 292, a user need only overcome the net biasing force 296 to actuate the drive assembly 120, as opposed to the entire extensive biasing force 294. When such an actuating force F132 is applied to the pushbar 132, the drive bar 122 and bell crank 136 move to the retracted position illustrated in FIG. 5, and the latchbolt 152 is retracted.

In certain circumstances, it may be desirable to adjust the actuating force F132 required to actuate the drive assembly 120 and retract the latchbolt 152. To do so, an installer or maintenance personnel may operate the force adjustment mechanism 200 to adjust the counterbalance spring force F250, thereby adjusting the retractive biasing force 292 and the net biasing force 296. For example, to reduce the net biasing force 296 (and thus the required actuating force F132), maintenance personnel may rotate the adjustment bolt 220 in a first direction. As the adjustment bolt 220 is rotated in the first direction, the sleeve 230 moves in the distal direction as a result of the engagement between the exterior threads 226 of the adjustment bolt 220 and the interior threads 236 of the sleeve 230. As the sleeve 230 moves in the distal direction, the spring 250 becomes further compressed, resulting in an increased counterbalance spring force F250. To reduce the net biasing force 296, the adjustment bolt 220 may be rotated in an opposite direction, thereby moving the sleeve 230 in the proximal direction. As the sleeve 230 moves in the proximal direction, the counterbalance spring 250 expands, and the counterbalance spring force F250 is reduced.

Figure 6:
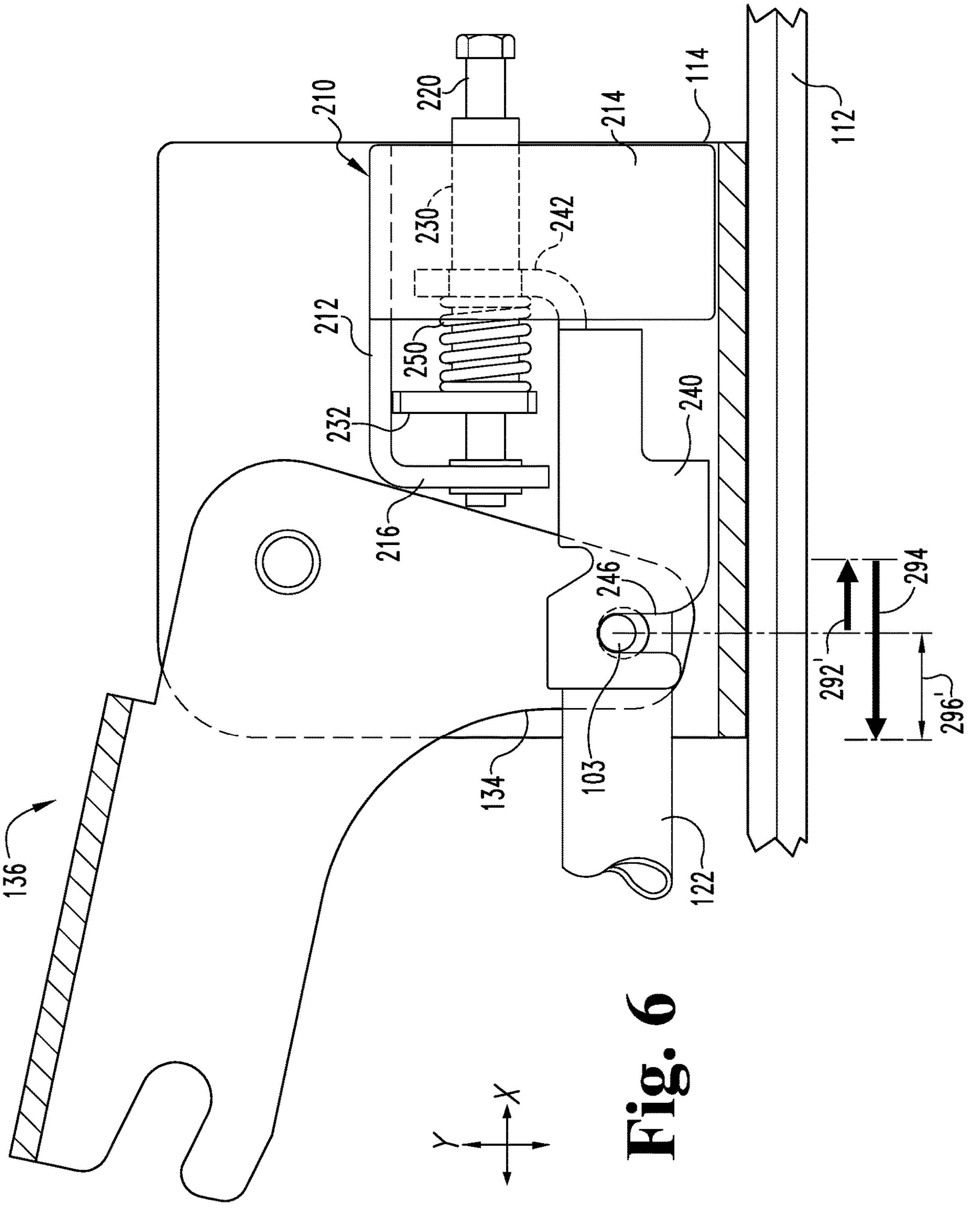
FIG. 6 illustrates the force adjustment mechanism illustrated in FIG. 3 in a second configuration, with the exit device in the extended state.

FIG. 6 illustrates the force adjustment mechanism 200 in a second configuration, in which the adjustment bolt 220 has been rotated to move the sleeve 230 to a distal position. With the sleeve 230 in the distal position, the spring 250 has a greater compression displacement as compared with the compression displacement illustrated in FIG. 3. As a result, the counterbalance force F250 exerted by the spring 250 is increased, resulting in an increased retractive biasing force 292' and a reduced net biasing force 296'. Thus, with the force adjustment mechanism 200 in the second configuration, a user need only overcome the reduced net biasing force 296' to actuate the drive assembly 120.

As can be seen from the foregoing, the force adjustment mechanism 200 is operable in a plurality of configurations to adjust the actuating force F132 required to actuate the drive assembly 120. For example, the actuating force F132 may have a first value of about eight pounds (8 lbf) with the force adjustment mechanism 200 in the first configuration, and the actuating force F132 may have a second value of about five pounds (5 lbf) with the force adjustment mechanism 200 in the second configuration. As used in connection with forces, the term “about” may be used to indicate that the actual value of the force may vary from a nominal value within an industry-accepted range.

Figure 7:
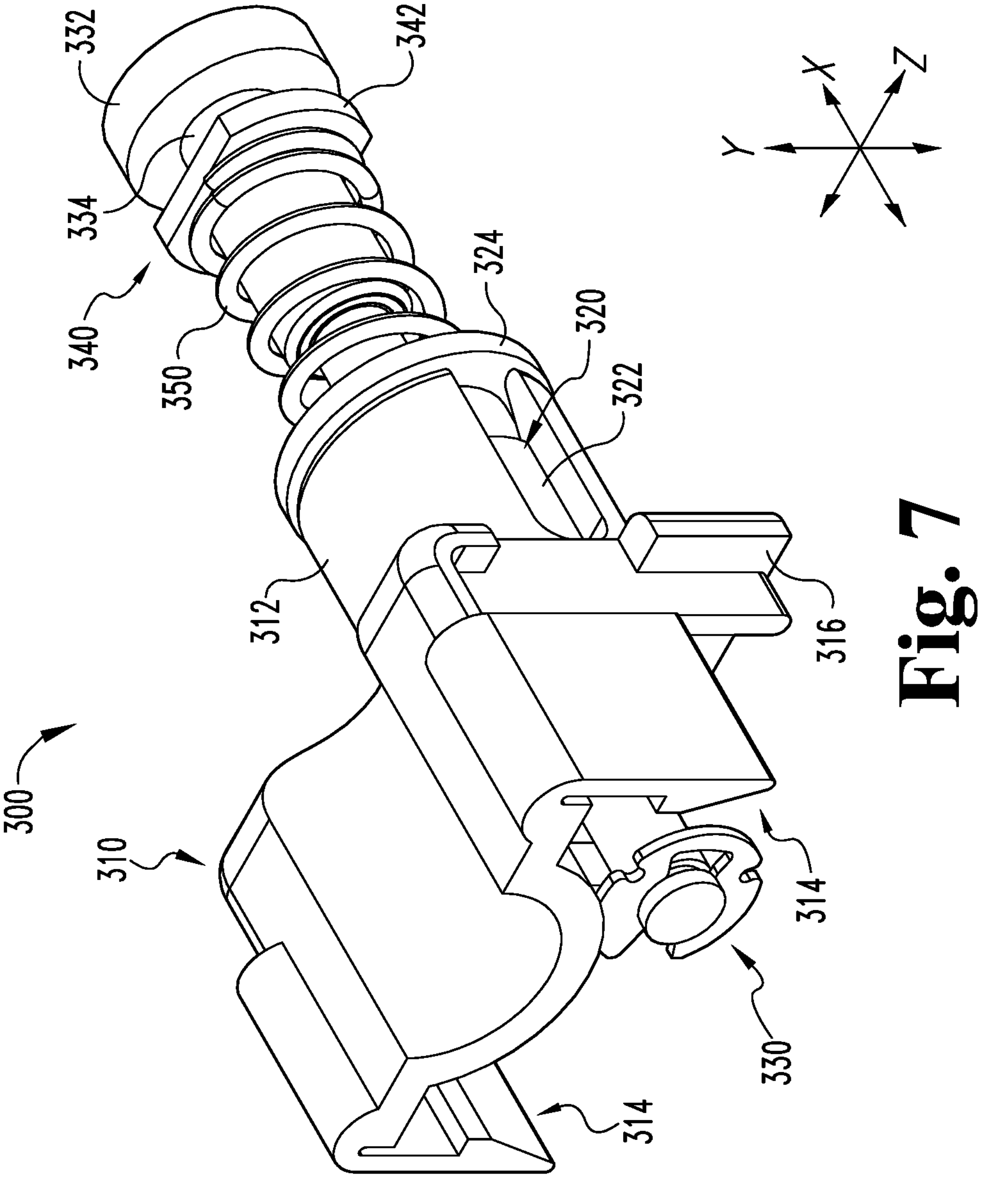
FIG. 7 is a perspective illustration of a force adjustment mechanism according to another embodiment.
Figure 8:
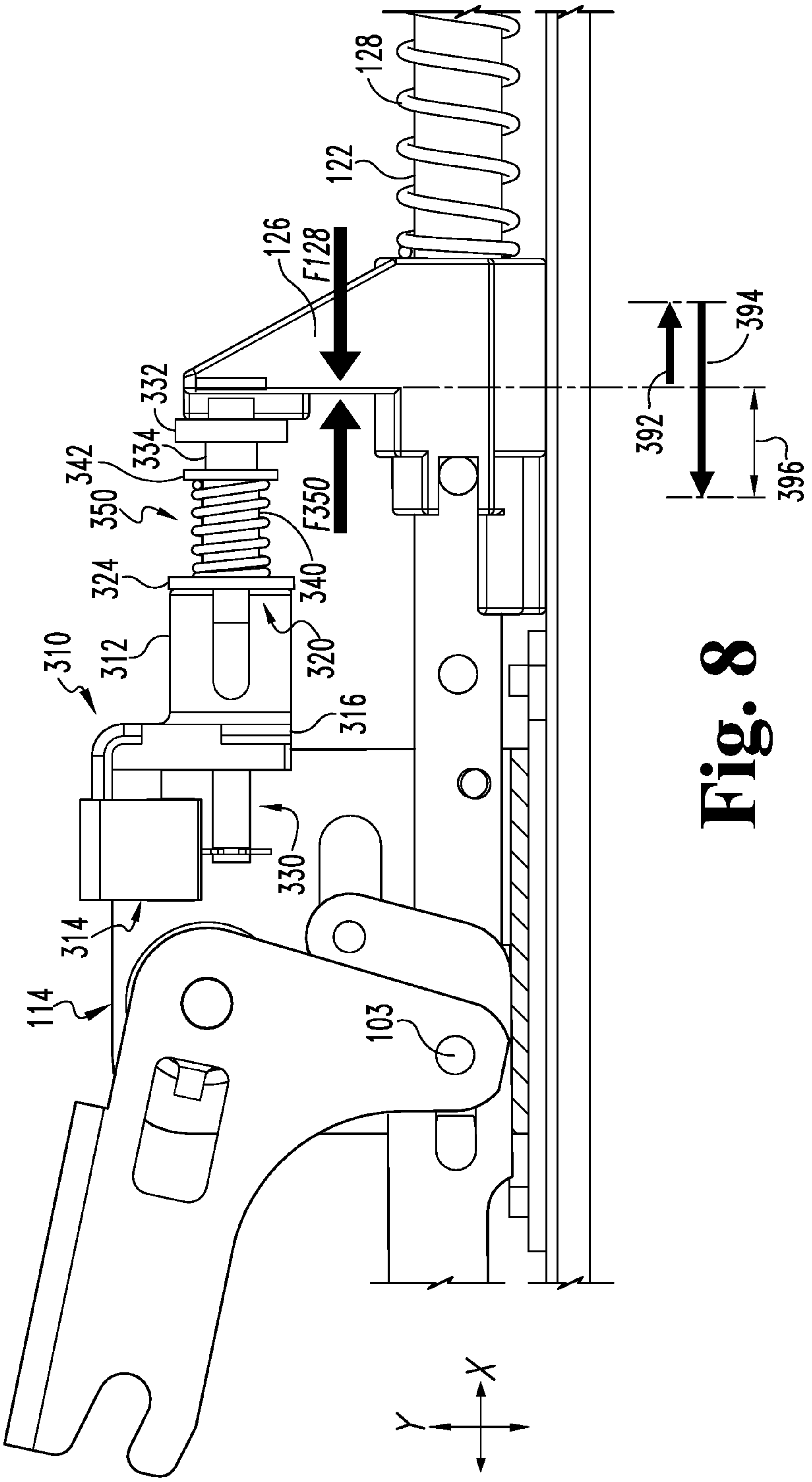
FIG. 8 illustrates the force adjustment mechanism illustrated in FIG. 7 in a first configuration, along with a portion of the exit device illustrated in FIG. 1.
Figure 9:
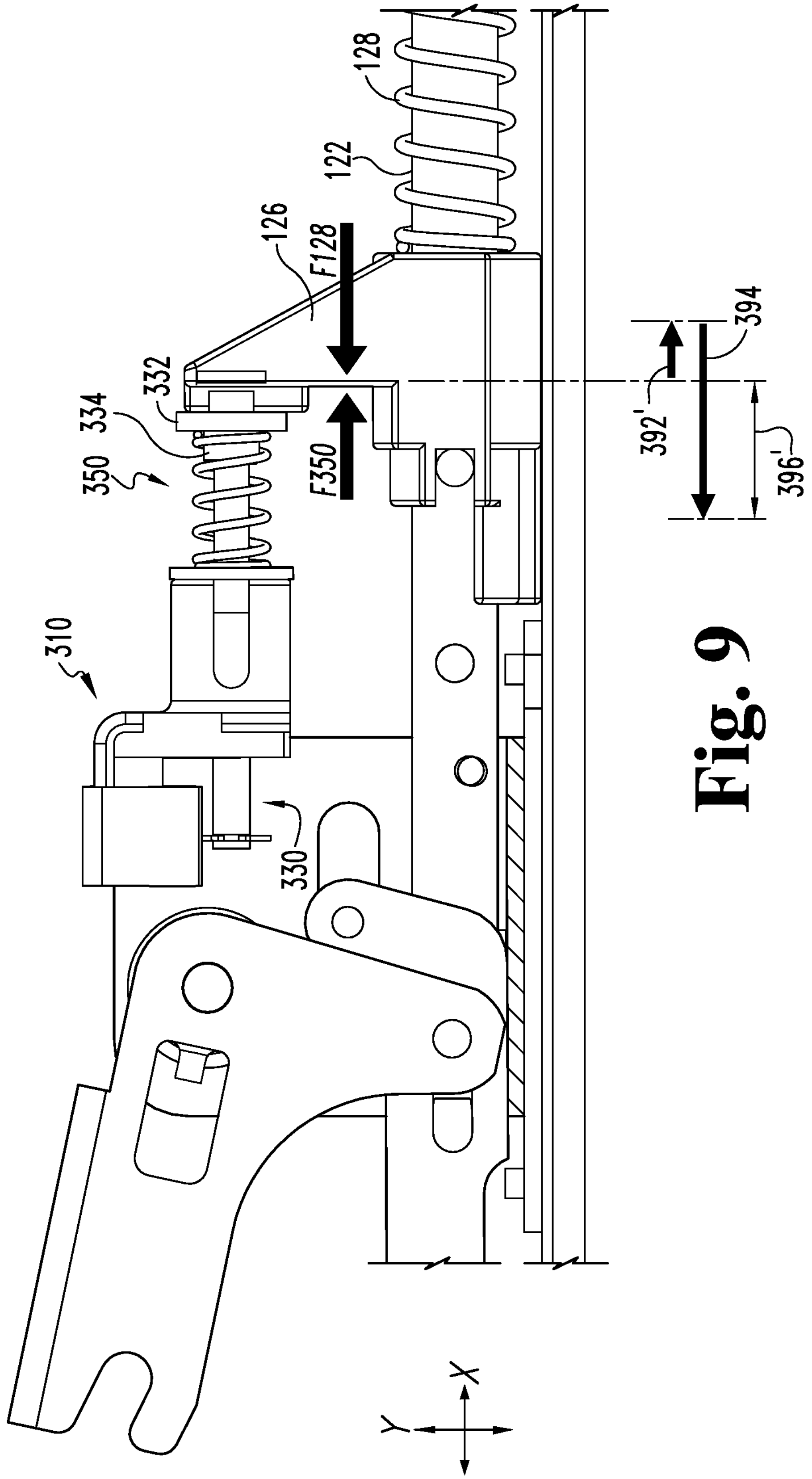
FIG. 9 illustrates the force adjustment mechanism illustrated in FIG. 7 in a second configuration, along with a portion of the exit device illustrated in FIG. 1.

With reference to FIG. 7-9, a force adjustment mechanism 300 according to another embodiment includes a housing 310, a bushing 320 supported by the housing 310, a plunger 330 movably supported by the bushing 320, a sleeve 340 mounted on the plunger 330, and a spring 350 which, in the illustrated form, is mounted on the sleeve 340. In the illustrated embodiment, the force adjustment mechanism 300 is configured as a retrofit for an exit device such as the above-described exit device 100. For example, FIG. 8 illustrates the force adjustment mechanism 300 installed in the exit device 100 in place of the damper assembly 140 illustrated in FIGS. 1 and 2. In other embodiments, the force adjustment mechanism 300 may be configured as a retrofit for another form of exit device, or may be included in an exit device at the time of sale.

The housing 310 generally includes a sleeve portion 312 sized and configured to receive the bushing 320. The housing 310 may further include clips 314 configured to secure the housing 310 to the mounting bracket 114. The housing 310 may further include a wall 316 which abuts the distal sides of the mounting bracket walls 115 to provide longitudinal support for the force adjustment mechanism 300.

The bushing 320 includes a body portion 322 seated in the sleeve portion 312 of the housing 310, and may further include an enlarged diameter portion 324 positioned on the distal side of the sleeve portion 312. The plunger 330 extends longitudinally through the bushing 320, and is movable in the longitudinal direction. The plunger 330 includes an enlarged diameter portion 332, and may further include a shoulder 334. The sleeve 340 is supported by the plunger 330, and includes an enlarged distal end 342. The sleeve 340 has an inner diameter ID which is less than the outer diameter OD of the shoulder 334.

FIG. 8 illustrates the force adjustment mechanism 300 in a first configuration and the exit device 100 in the extended state. In this state, the spring 350 is compressed between the enlarged portion 324 of the bushing 320 and the enlarged distal end 342 of the sleeve 340. The compressed spring 350 urges the sleeve 340 into contact with the shoulder 334, thereby urging the distal end of the plunger 330 into engagement with the collar 126. As a result, the spring 350 exerts a counterbalance spring force F350, which contributes to a retractive force 392 urging the drive assembly 120 and the pushbar assembly 130 in the bolt-retracting direction.

As noted above, the main spring 128 urges the drive bar 122 in the bolt-extending direction. The biasing force F128 of the main spring 128 contributes to an extensive biasing force 394 urging the drive assembly 120 in the bolt-extending direction. This extensive biasing force 394 is partially counteracted by the retractive force 392 (including the counterbalance spring force F350), resulting in a net biasing force 396 urging the drive bar 122 in the bolt-extending direction. Thus, in order to actuate the drive assembly 120, a user need only overcome the net biasing force 396, as opposed to the entire extensive biasing force 394.

FIG. 9 illustrates the exit device 100 in the extended state and the force adjustment mechanism 300 in a second configuration. In the illustrated second configuration of the force adjustment mechanism 300, the sleeve 330 has been removed. As a result, the spring 350 has expanded, and provides a reduced counterbalance spring force F350. This results in a reduced retractive biasing force 392' when compared with the retractive biasing force 392 illustrated in FIG. 8. Due to the fact that the extensive biasing force 394 has not changed, the net force 396' urging the drive bar 122 in the bolt-extending direction is greater than the net force 396 provided in the configuration illustrated in FIG. 10.

In order to adjust the net force 396 biasing the exit device 100 toward the extended state, maintenance personnel may add or remove the sleeve 330, thereby adjusting the counterbalance spring force F350 provided by the force adjustment mechanism 300. In the illustrated form, the enlarged portion 342 is formed at the end of the sleeve 340, and the force adjustment mechanism 300 is operable to selectively provide each of two retractive forces. In other embodiments, the enlarged portion 342 may be formed between the center of the sleeve 330 and the end of the sleeve 330. In such embodiments, the force adjustment mechanism 300 may be operable in three or more configurations, and may provide a different counterbalance spring force F350 in each of the configurations. For example, in one configuration, the sleeve 330 may be installed in a first orientation to compress the spring 350 by a first compression displacement, resulting in a first value of the counterbalance spring force F350. In another configuration, the sleeve 330 may be installed in a second orientation and compress the spring 350 by a second compression displacement, resulting in a second value of the counterbalance spring force F350. In a third configuration, the sleeve 330 may be removed, such that the spring 350 is compressed by a third compression displacement, resulting in a third value of the counterbalance spring force F350. Due to the fact that the counterbalance spring force F350 partially counteracts the extensive biasing force 394, the value of the net biasing force 396 may vary according to the value of the counterbalance spring force F350.

It is also contemplated that the retractive biasing force provided by the force adjustment mechanism 300 may be adjusted in another manner. For example, the plunger 330 and the sleeve 340 may be threadedly engaged with one another such that rotation of the plunger 330 longitudinally moves the sleeve 340, thereby adjusting the compression of the spring 350. An example of such a force adjustment mechanism 900 is described below with reference to FIG. 17.

Figure 10:
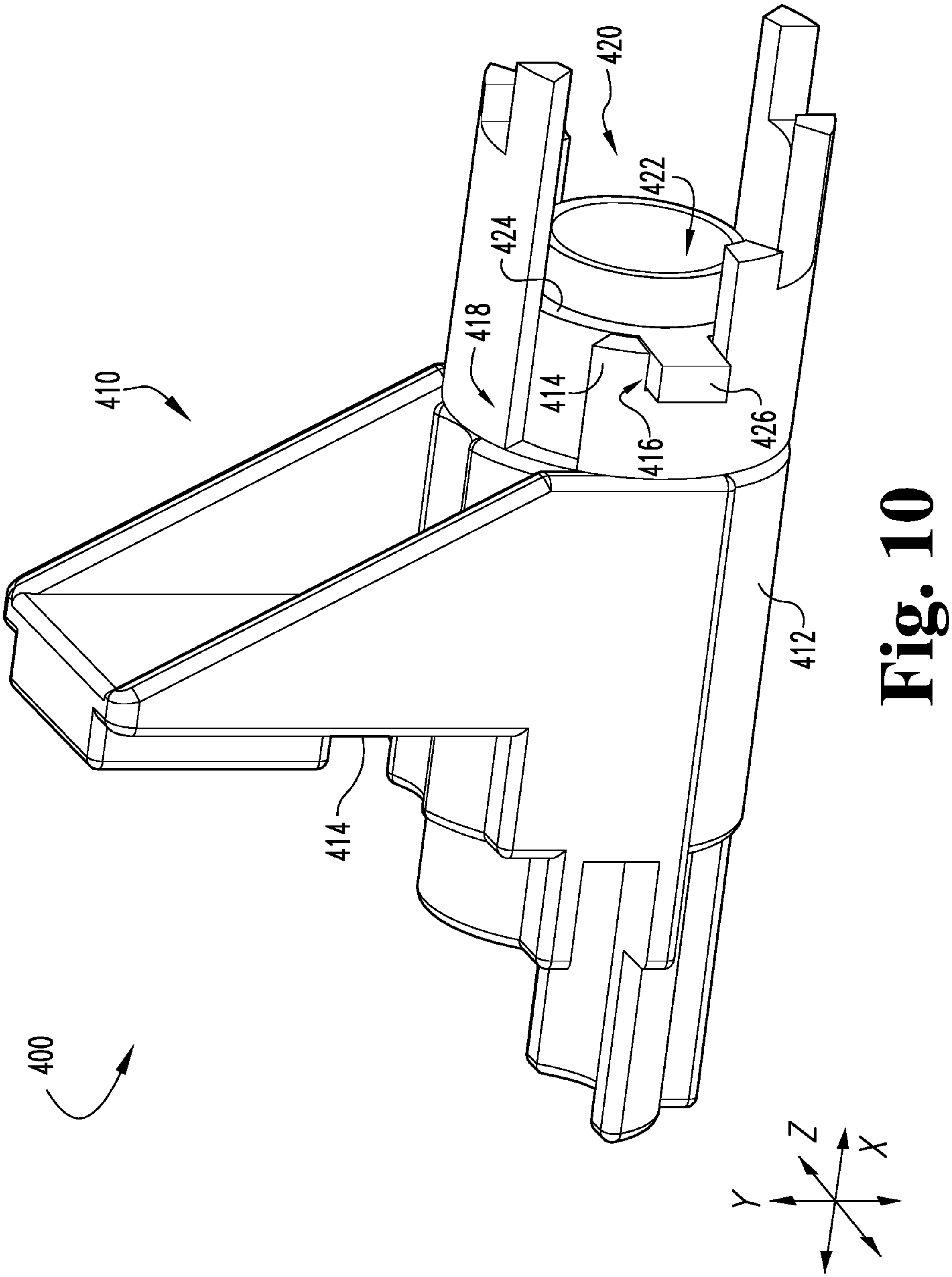
FIG. 10 is a perspective illustration of a force adjustment mechanism according to another embodiment.

With reference to FIG. 10, a force adjustment mechanism 400 according to another embodiment includes a collar 410 and a sleeve 420 movably supported by the collar 410. The force adjustment mechanism 400 may, for example, be used in the exit device 100 in place of the collar 126. Additionally, the force adjustment mechanism 400 may be used in combination with either the force adjustment mechanism 300 or the damper assembly 140.

The collar 410 is sized and configured to replace the collar 126, and may be coupled to the drive bar 122 for longitudinal movement therewith. The collar 410 includes a body 412, and may further include an arm 414 extending laterally from the body 412. In embodiments which include the arm 414, the arm 414 may engage the force adjustment mechanism 300 or the damper assembly 140. The body 412 includes a first channel 416, a second channel 418, and a ridge 419 separating the first and second channels 416, 418. Each of the channels 416, 418 extends into the body 412 in the proximal direction, and the second channel 418 extends proximally beyond the end of the first channel 416. The collar 410 may also include additional channels having varying depths in the longitudinal direction.

The sleeve 420 is movably supported by the collar 410, and includes an opening 422 sized and configured to receive the drive bar 122, a shoulder 424, and a radial protrusion 426. The sleeve 420 has a first position in which the radial protrusion 426 is received in the first channel 416, and a second position in which the radial protrusion 426 is received in the second channel 418. The ridge 419 prevents the sleeve 420 from rotating between the first position and the second position until the protrusion 426 is moved distally out of the channels 416, 418.

When installed in the exit device 100, the drive bar 122 extends longitudinally through the opening 422, and the main spring 128 is compressed between the washer 129 and the shoulder 424. Additionally, the force adjustment mechanism 400 may be installed in each of a plurality of configurations to selectively provide the exit device 100 with each of a plurality of net biasing forces. For example, a first configuration of the force adjustment mechanism 400 may include the first position of the sleeve 420, and a second configuration may include the second position of the sleeve 420.

With the sleeve 420 in the first position, the protrusion 426 is received in the first channel 416, and the shoulder 424 is offset from the washer 129 by a first distance. Thus, with the force adjustment mechanism 400 in the first configuration, the main spring 128 has a first compression displacement, and contributes a first main spring force F128 to the extensive biasing force. With the sleeve 420 in the second position, the protrusion 426 is received in the second channel 418, and the shoulder 424 is offset from the washer 129 by a second distance greater than the first distance. As a result, the main spring 128 is compressed by a second and lesser compression distance, and contributes a second and lesser force F128 to the extensive biasing force.

It is to be appreciated that in embodiments which include more than the two illustrated channels 416, 418, the sleeve 420 may be operable in a corresponding number of positions, and the force adjustment mechanism 400 may have a corresponding number of configurations. The distance between the shoulder 424 and the washer 129 may be different in each of the configurations, thereby providing varying compression displacements. As a result, the force adjustment mechanism 400 may be operable to adjust the force F128 provided by the main spring 128 among a plurality of discrete steps, resulting in a corresponding change to the extensive biasing force, and thus to the net biasing force.

Figure 11:
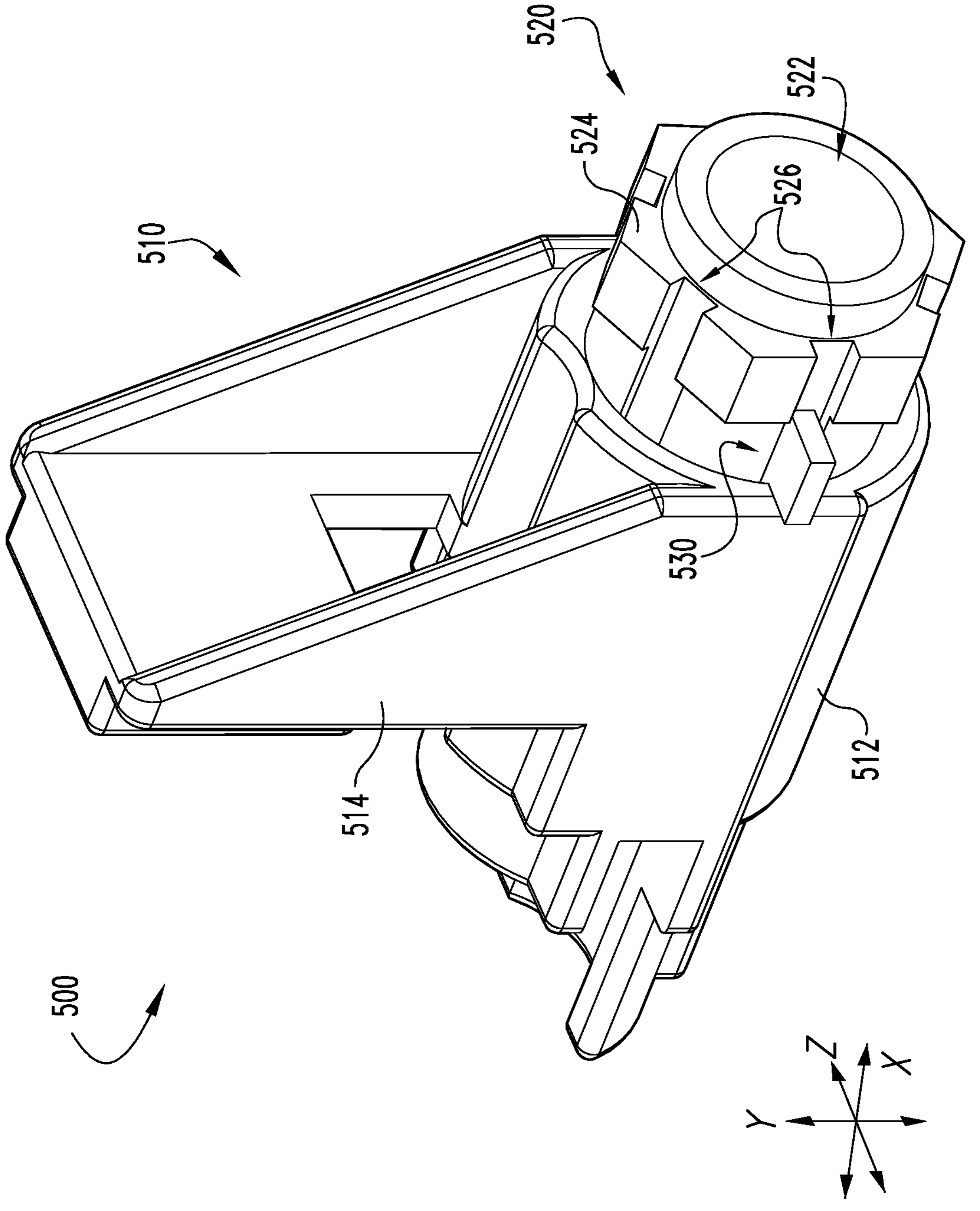
FIG. 11 is a perspective illustration of a force adjustment mechanism according to another embodiment.

With reference to FIG. 11, a force adjustment mechanism 500 according to another embodiment includes a collar 510, a sleeve 520 movably supported by the collar 510, and a spline 530 slidably mounted on the collar 510. The force adjustment mechanism 500 may, for example, be used in the exit device 100 in place of the collar 126. Additionally, the force adjustment mechanism 500 may be used in combination with either the force adjustment mechanism 300 or the damper assembly 140.

The collar 510 is sized and configured to replace the collar 126, and may be coupled to the drive bar 122 for longitudinal movement therewith. The collar 510 includes a body 512, and may also include an arm 514 extending laterally from the body 512. In embodiments which include the arm

514, the arm 514 may engage the force adjustment mechanism 300 or the damper assembly 140. The sleeve 520 is movably supported by the collar 510, and includes an opening 522 sized and configured to receive the drive bar 122, a shoulder 524, and plurality of slots 526 extending longitudinally through the shoulder 524. The spline 530 is sized and configured to be received in each of the slots 526, and is configured to inhibit rotation of the sleeve 520 when received in one of the slots 526.

When installed in the exit device 100, the collar 510 is coupled to the drive bar 122 for longitudinal movement therewith. Additionally, the drive bar 122 extends longitudinally through the opening 522, and the main spring 128 is compressed between the distal mounting bracket 114 and the shoulder 524. The sleeve 520 is threadedly engaged with the collar 510, such that rotation of the sleeve 520 also causes the sleeve 520 to move longitudinally. As a result, the longitudinal position of the shoulder 524, and thus the compression displacement of the spring 128, can be adjusted by rotating the sleeve 520.

It is to be appreciated that an authorized user may adjust the net biasing force of an exit device by operating the force adjustment mechanism 500. In order to do so, the user may slide the spline 530 out of the slot 526, and rotate the sleeve 520 to adjust the compression displacement of the spring 128. For example, in order to increase the net biasing force, the sleeve 520 may be rotated in a first direction to move the shoulder 524 in the distal direction, thereby increasing the compression displacement of the spring 128. Conversely, when a lower net force is desired, the sleeve 520 may be rotated in an opposite direction to move the shoulder 524 in the proximal direction, thereby decreasing the compression displacement of the spring 128. Once the appropriate extensive force has been achieved, the user may slide the spline 530 into an aligned slot 526 to rotationally lock the sleeve 520 with the collar 510.

Figure 12:
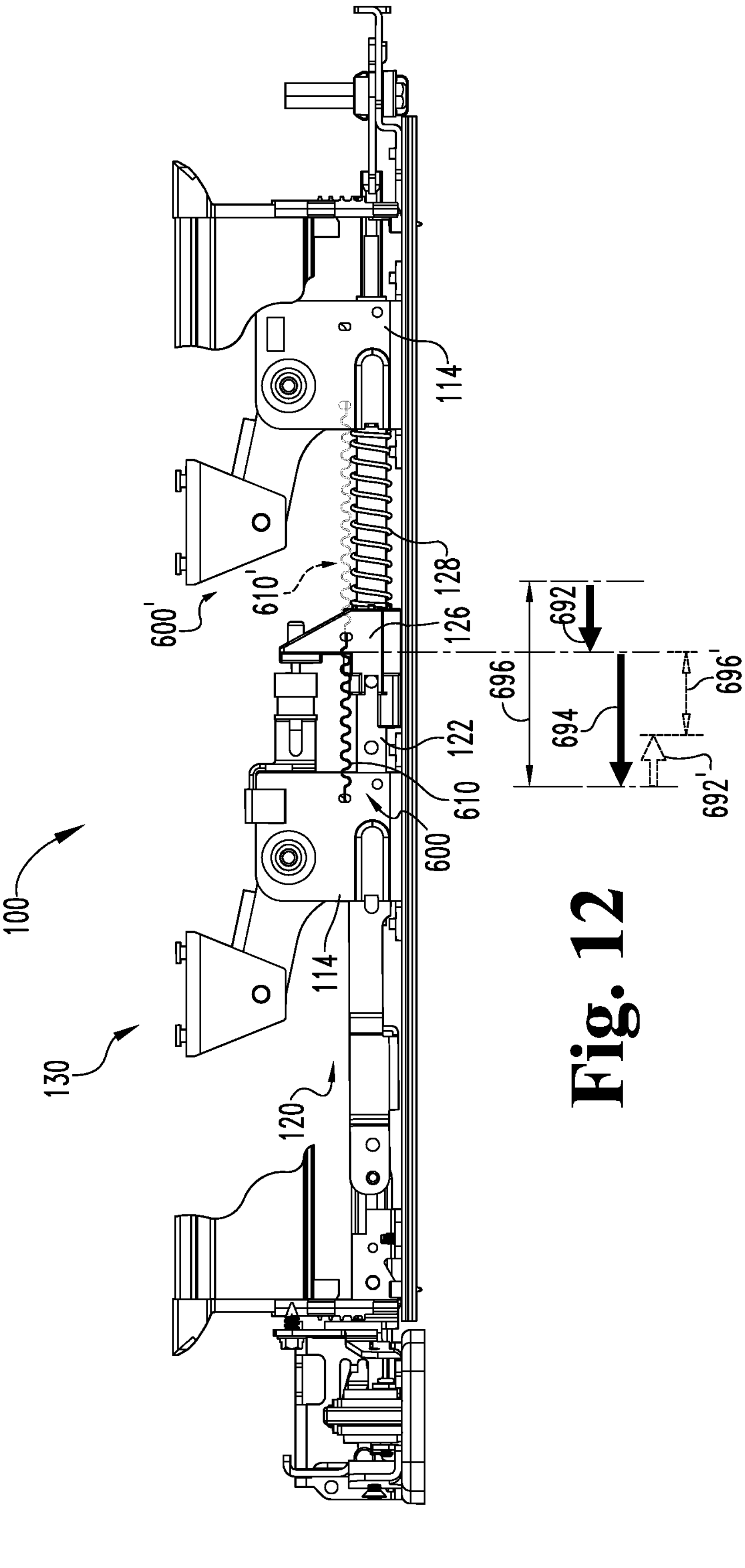
FIG. 12 illustrates the exit device illustrated in FIG. 1 with a force adjustment mechanism according to another embodiment.

With reference to FIG. 12, the exit device 100 is illustrated with a force adjustment mechanism 600 according to another embodiment. In the illustrated form, the force adjustment mechanism 600 includes a tension spring 610, which is stretched between the proximal mounting bracket 114 and the collar 126. The tension spring 610 urges the collar 126 in the proximal direction, providing an extensive biasing force 692 which supplements the extensive biasing force 694 provided at least in part by the main spring 128. As a result, the net force 696 biasing the drive assembly 120 and pushbar assembly 130 in the extending direction is increased. In another embodiment, a force adjustment mechanism 600' may include a tension spring 610' stretched between the collar 126 and the distal mounting bracket 114. In such embodiments, the spring 610' may exert a retractive force which partially counteracts the extensive biasing force 694, resulting in a reduced net extensive biasing force 696. In either embodiment, the net force 696 biasing the drive assembly 120 and pushbar assembly 130 in the extending direction may be adjusted by adding or removing the tension spring 610.

In certain embodiments, the spring 610 may be selectively engageable with each of the mounting brackets 114. With the force adjustment mechanism 600 in a first configuration, the spring 610 may be stretched between the proximal mounting bracket 114 and the collar 126, providing an extensive biasing force contributing to net biasing force. With the force adjustment mechanism in a second configuration (illustrated in phantom as element 610'), the spring 610 may be stretched between the distal mounting bracket 114 and the collar 126, providing a retractive biasing force detracting from net biasing force.

Figure 13:
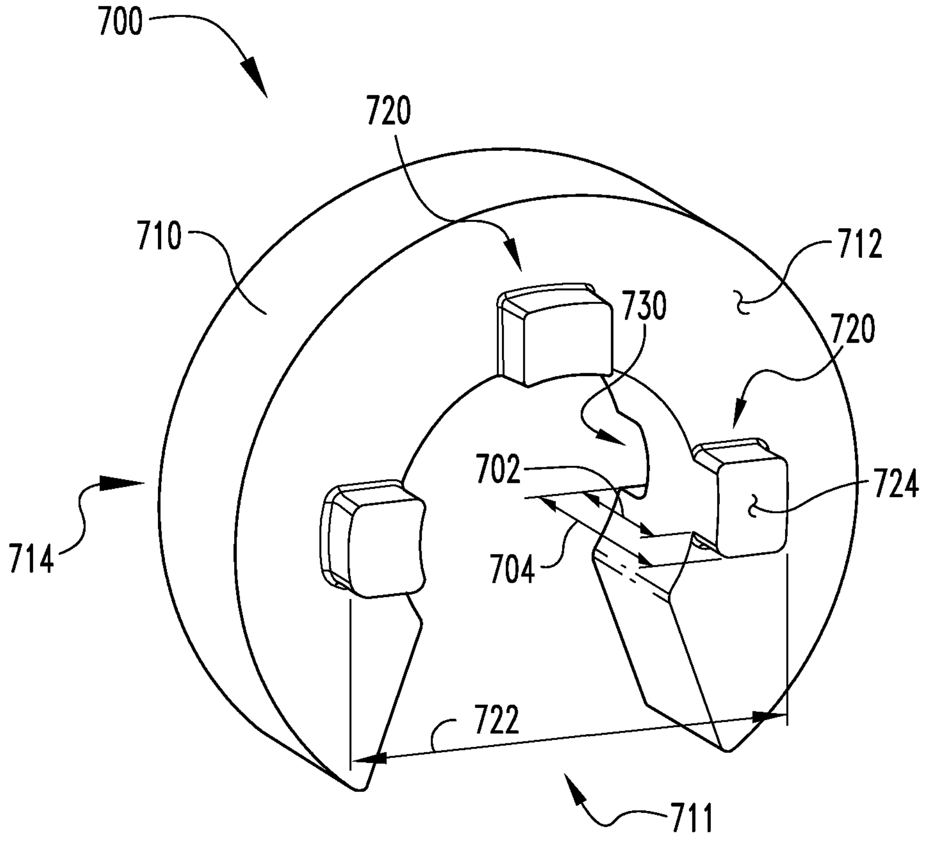
FIG. 13 is a perspective illustration of a force adjustment mechanism according to another embodiment.

With reference to FIG. 13, a force adjustment mechanism 700 according to another embodiment includes a sleeve or spacer having a C-shaped body 710 sized and configured to be snapped onto the drive bar 122. The force adjustment mechanism 700 may, for example, be snapped onto the drive bar 122 adjacent the collar 126 or the distal mounting bracket 114. With the force adjustment mechanism 700 installed, the compression displacement of the main spring 128 is increased, thereby increasing the extensive biasing force provided by the main spring 128.

The force adjustment mechanism 700 may also include one or more protrusions 720 extending longitudinally from a first face 712 of the body 710. The distance 722 between the radially outer surfaces of the protrusions 720 may be slightly less than the inner diameter ID of the main spring 128, such that the protrusions 720 can be received within the end coil of the spring 128. In such forms, the force adjustment mechanism 700 may be installed on the drive bar 122 in either of two orientations to selectively adjust the compression displacement of the main spring 128, thereby enabling fine-tuning of the extensive biasing force provided by the main spring 128.

For example, the force adjustment mechanism 700 may be installed in a first configuration in which the protrusions 720 face the spring 128, and a second configuration in which the protrusions 720 abut the collar 126. In the first configuration, the end of the main spring 128 abuts the first face 712 of the body 710, such that compression displacement of the spring 128 is increased by a distance 702 corresponding to the thickness of the body portion 710. In the second orientation, the protrusions 720 abut the collar 126 or the washer 129, and the end of the main spring 128 abuts the second face 714 of the body portion 710. As a result, the compression displacement of the spring 128 is increased by the distance 704 between the second face 714 of the body 710 and the faces 724 of the protrusions.

As will be appreciated, due to the fact that the additional compression of the spring 128 corresponds to the configuration in which the force adjustment mechanism 700 is installed, the extensive biasing force F128 provided by the spring 128, and thus the net extensive biasing force on the drive assembly 120 and pushbar assembly 130, can be adjusted by installing the force adjustment mechanism 700 in the appropriate configuration.

The force adjustment mechanism 700 may also include one or more recesses 730 extending longitudinally into the body 710 from the second face 714. The recesses 730 may be sized and configured to receive the protrusions 720, such that two or more of the force adjustment mechanisms 700 can be stacked onto the drive bar 122 to further increase the compression displacement of the main spring 128. With the protrusions 720 received in the recesses 730, the force adjustment mechanisms 700 may be rotationally coupled with one another, such that the gaps 711 defining the C-shape of the body 710 remain aligned, enabling simpler installation and removal of the force adjustment mechanisms 700. In other embodiments, the force adjustment mechanism 700 need not include the protrusions 720 and recesses 730, and the force adjustment mechanisms 700 need not be rotationally coupled with one another when stacked on the drive bar 122.

Figure 14:
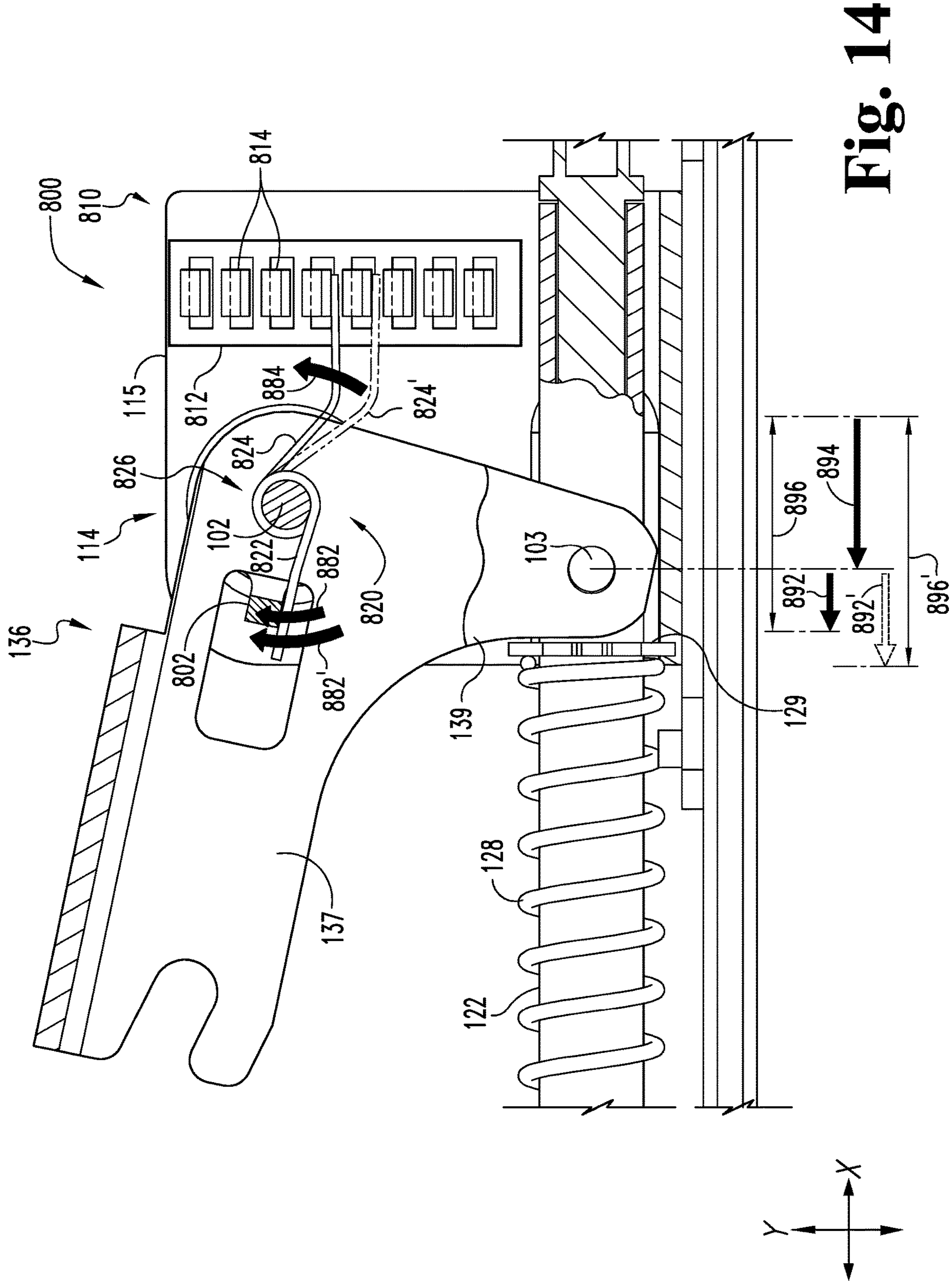
FIG. 14 illustrates a force adjustment mechanism according to another embodiment installed in a first orientation on an exit device.
Figure 15:
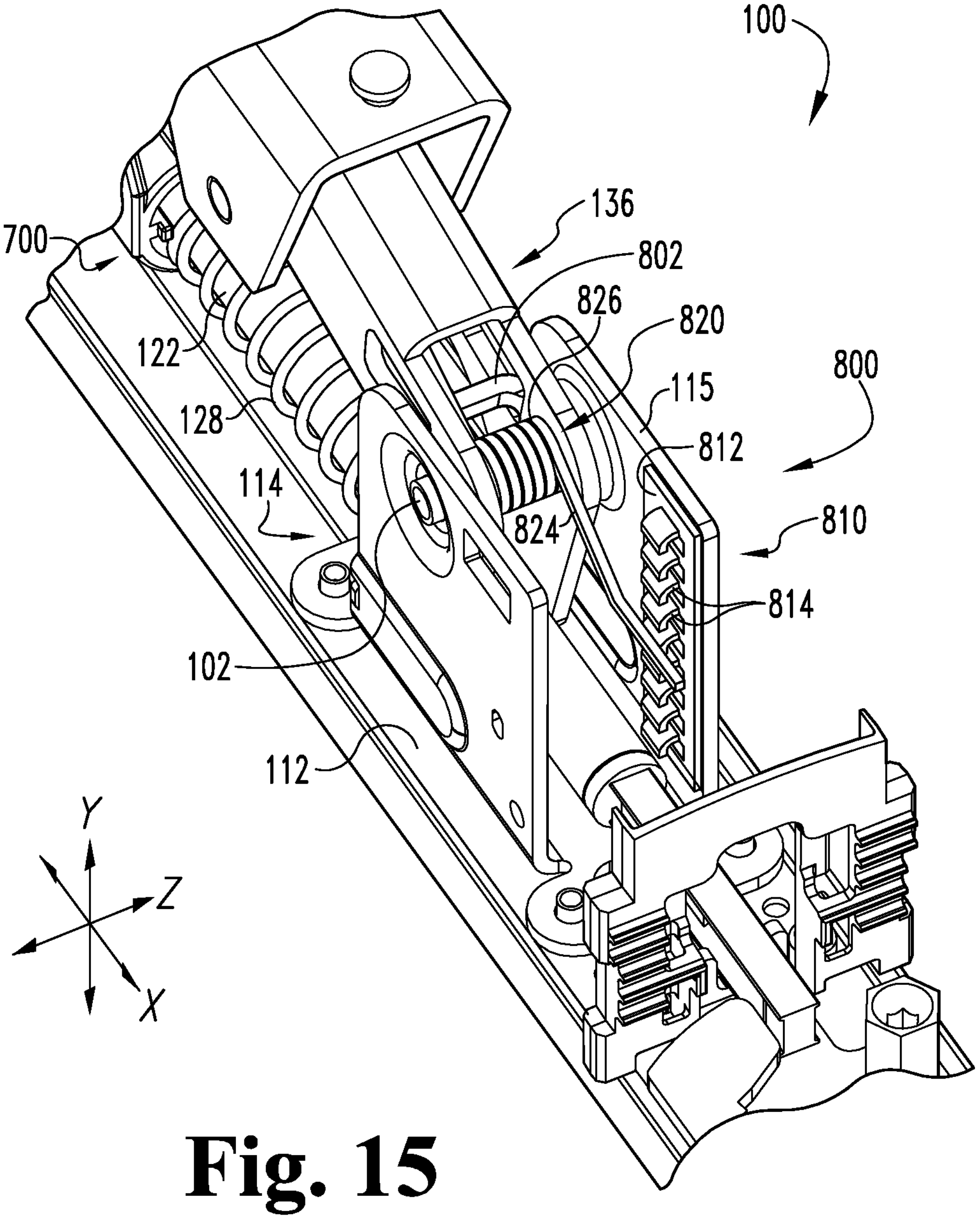
FIG. 15 is a perspective illustration of the force adjustment mechanism and exit device illustrated in FIG. 14.

With reference to FIGS. 14 and 15, the exit device 100 is illustrated with a force adjustment mechanism 800 according to another embodiment. The force adjustment mechanism 800 generally includes an anchor plate 810 mounted on one of the mounting brackets 114, and torsion spring 820 engaged with the anchor plate 810 and one of the bell cranks 136.

The anchor plate 810 includes a plate portion 812 mounted on one of the walls 115 of the mounting bracket 114, and a plurality of flanges 814 extending transversely toward the other wall 115 of the mounting bracket 114. As illustrated in FIG. 15, the flanges 814 may also extend in the lateral direction toward the base plate 112. While the illustrated flanges 814 are arcuate, it is also contemplated that the flanges 814 may be rectilinear. For example, the flanges 814 may be obliquely offset with respect to the plate portion 812.

The torsion spring 820 generally includes a first arm 822 engaged with the bell crank 136, and a second arm 824 engaged with the anchor plate 810. More specifically, the first arm 822 is engaged with a finger 802 formed on the bell crank 136, and the second arm 824 is engaged with one of the flanges 814. In the illustrated form, the first spring arm 822 is engaged with the first arm 137 of the bell crank 136. It is also contemplated that the first spring arm 822 may be engaged with another portion of the drive assembly 120, such as the second arm 139 of the bell crank 136, the drive bar 122, or the pivot pin 103. The torsion spring 820 also includes a coiled section 826, which is wrapped about the pivot pin 102 and connects the first and second arms 822, 824.

In FIG. 14, the force adjustment mechanism 800 is illustrated in a first configuration, in which the torsion spring 820 is provided with a first torsional displacement about the pivot pin 102. As a result, the first arm 822 exerts a torque 882 about the pivot pin 102 on the bell crank 136, and the second arm 824 exerts an opposing torque 884 which urges the second arm 824 into contact with the flange 814. With the flange 814 extending laterally toward the base plate 112, the flange 814 also retains the transverse position of the second arm 824. In the illustrated form, the torque 882 urges the bell crank 136 in the clockwise direction, thereby contributing to an extensive force 892 on the drive assembly 120. The supplemental extensive force 892 supplements the extensive biasing force 894, which may be provided at least in part by the main spring 128. As a result, each of the extensive biasing forces 892, 894 contributes to or increases the net biasing force 896.

It is to be appreciated that the net biasing force 896 can be adjusted by increasing or decreasing the extensive force 892 provided by the force adjustment mechanism 800. For example, FIG. 14 also illustrates the force adjustment mechanism 800 in a second configuration, in which the second arm 824 has been moved to engage a lower one of the flanges 814, as illustrated in phantom as the second arm second position 824'. With the second arm 824 in the second position 824', the torsional displacement of the torsion spring 820 is increased, resulting in an increased torque 882' being applied to the bell crank 136. As a result, a greater supplemental extensive force 892' is exerted on the drive bar 122, resulting in an increased net biasing force 896'.

Figure 16:
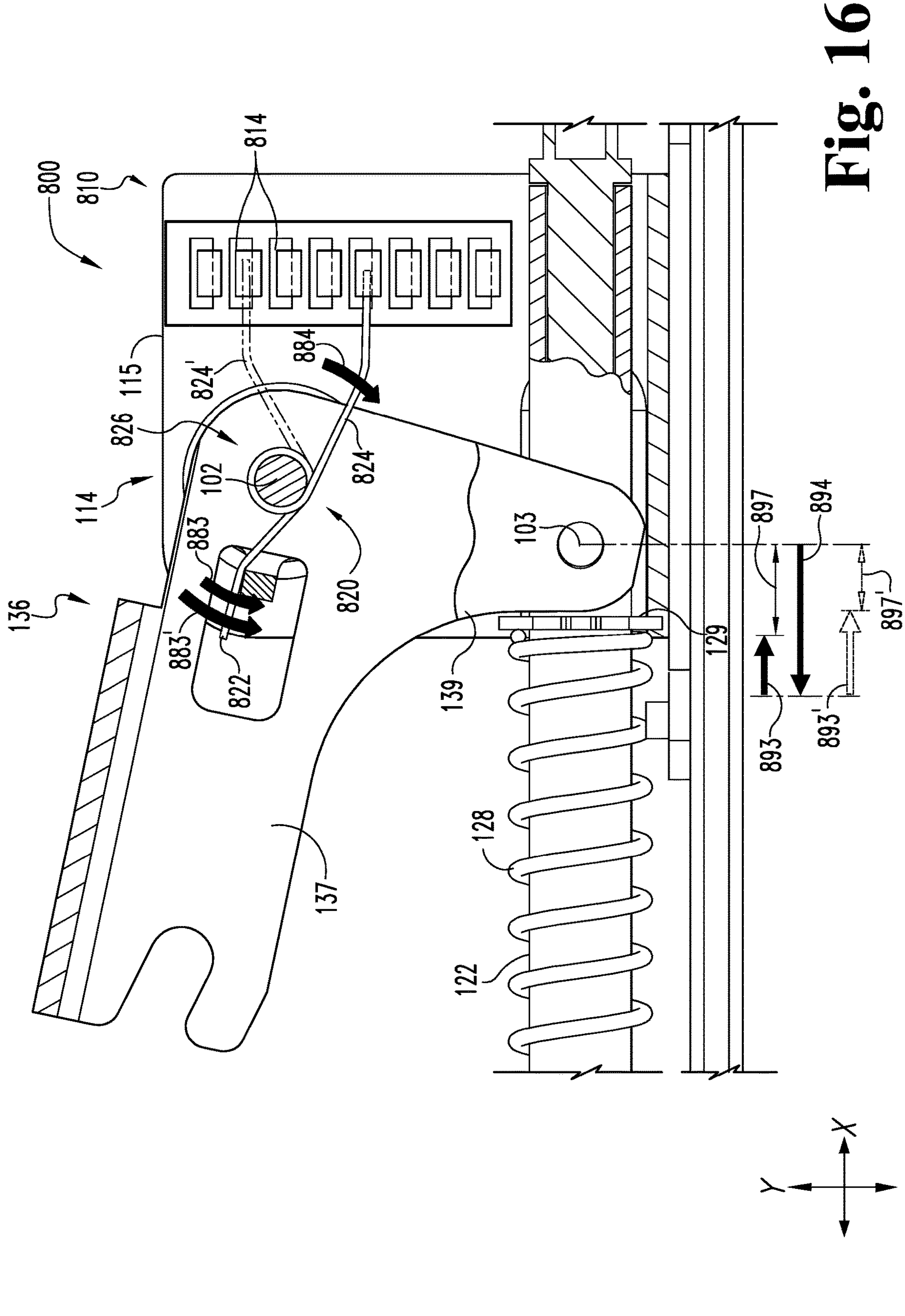
FIG. 16 illustrates the force adjustment mechanism illustrated in FIG. 14 installed in a second orientation on the exit device.

It is also contemplated that the force adjustment mechanism 800 may be configured to provide a counterbalance or retractive force which detracts from the net biasing force. With reference to FIG. 16, the force adjustment mechanism 800 is illustrated in one such configuration. In the configuration illustrated in FIG. 16, the spring 820 is mounted on the pin 102 in an opposite orientation as that illustrated in FIG. 14. As a result, the spring 820 exerts a counter-clockwise torque 883 on the bell crank 136. The anchor plate 810 may also be installed in a reverse orientation, such that the flanges 814 extend laterally away from the base plate 112. With the force adjustment mechanism 800 in the illustrated configuration, the counter-clockwise torque 883 results in a retractive force 893 being exerted on the drive bar 122. The retractive force 893 partially counteracts the extensive biasing force 894, resulting in a reduced net biasing force 897.

The net biasing force 897 can be adjusted by increasing or decreasing the torsional displacement of the torsion spring 820 to increase or decrease the retractive force 893 provided by the force adjustment mechanism 800. For example, the second arm 824 may be moved to engage a higher one of the flanges 814, as illustrated in phantom as the second arm second position 824'. With the second arm in the second position 824', the torsional displacement of the torsion spring 820 is increased, resulting in an increased counter-clockwise torque 883' being applied to the bell crank 136. As a result, a greater retractive force 893' is exerted on the drive bar 122, resulting in a further decreased net biasing force 897'.

Figure 17:
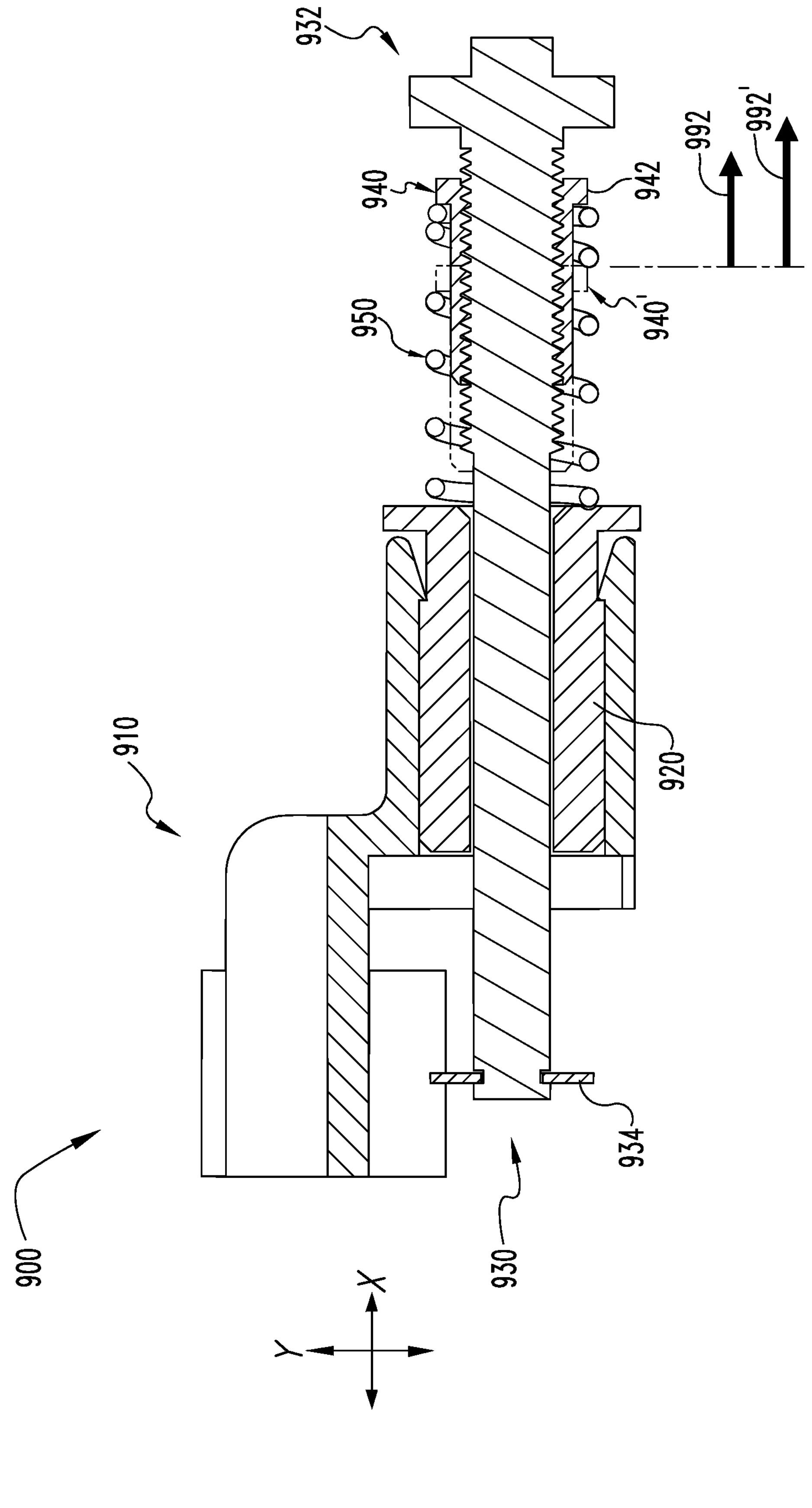
FIG. 17 is a side sectional view of a force adjustment mechanism according to another embodiment.

With reference to FIG. 17, a force adjustment mechanism 900 according to another embodiment is illustrated. The force adjustment mechanism 900 is substantially similar to the force adjustment mechanism 300 described above with reference to FIGS. 8-10. Unless indicated otherwise, similar reference characters are used to indicate similar elements and features. In the interest of conciseness, the following descriptions focus primarily on features that are different than those described above with regard to the force adjustment mechanism 300.

In the instant embodiment, the sleeve 940 is threadedly engaged with the plunger 930, such that the sleeve 940 moves longitudinally in response to rotation of one of the plunger 930 and the sleeve 940. In a first position of the sleeve 940, the spring 950 is compressed between the sleeve 940 and the housing 910. In this first state, the spring 950 is compressed by a first compression displacement, and urges the plunger 930 in the distal direction with a first distal biasing force 992. By rotating the plunger 930 or the sleeve 940, the sleeve 940 can be longitudinally moved to a second position, illustrated in phantom as element 940'. With the sleeve 940 in the illustrated second position 940', the compression displacement of the spring 950 is increased. As a result, the spring 950 urges the plunger 930 in the distal direction with a second distal biasing force 992', which is greater than the first distal biasing force 992.

Figure 18:
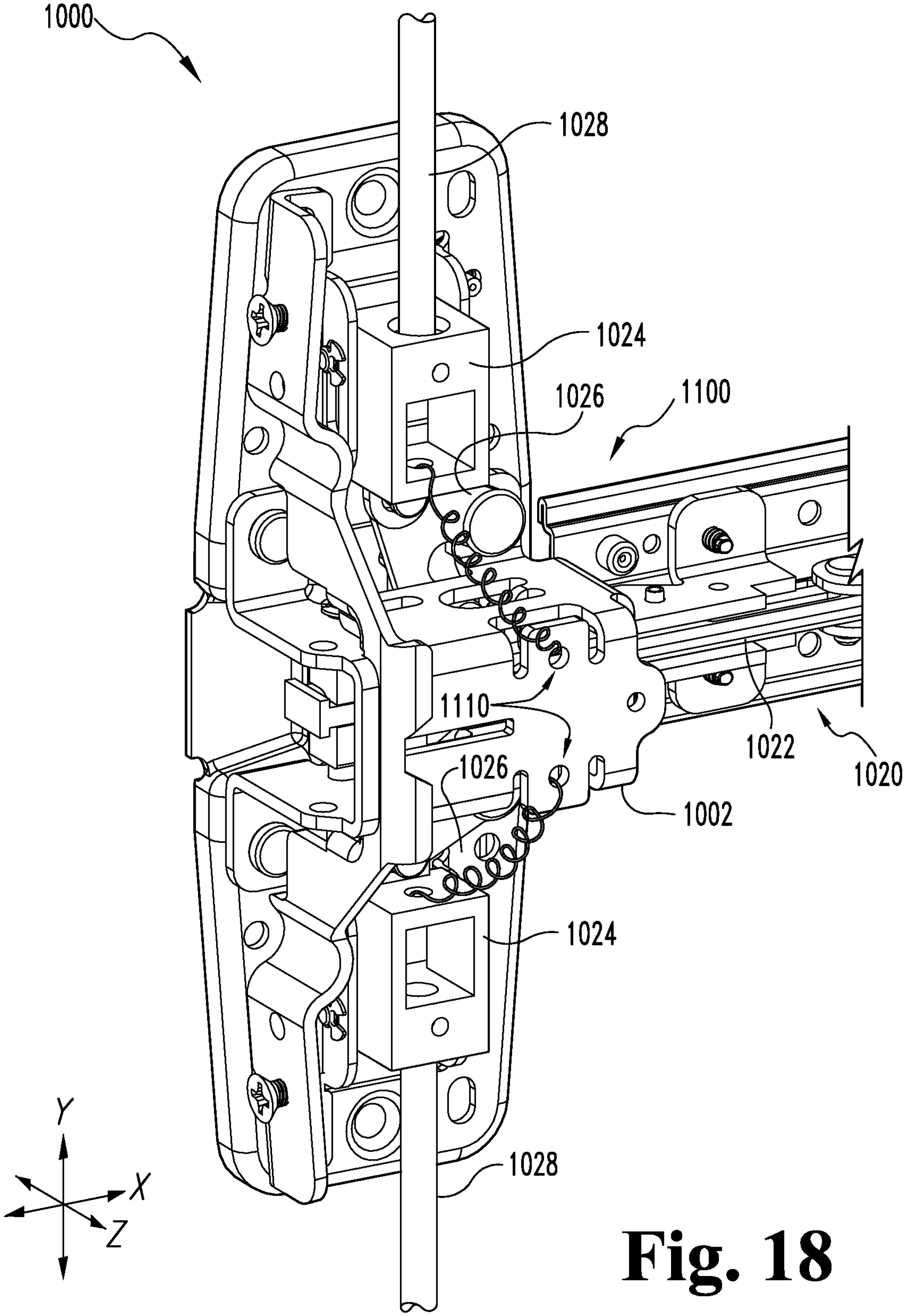
FIG. 18 is a perspective illustration of a force adjustment mechanism according to another embodiment and a portion of a second form of exit device.

While the exit device 100 is illustrated as a rim-type exit device, it is also contemplated that the force adjustment mechanisms described hereinabove may be used with other forms of exit devices, such as mortise exit devices and vertical exit devices. In certain forms, a force adjustment mechanism may be specifically configured for use with a particular form of exit device. For example, FIG. 18 illustrates a vertical exit device 1000 including a force adjustment mechanism 1100 according to another embodiment.

The vertical exit device 1000 includes a drive assembly 1020, which may include or be driven by a pushbar assembly such as the above-described pushbar assembly 130. The drive assembly 1020 includes a longitudinally movable drive bar 1022 driven by a pushbar, and a pair of transversely movable couplings 1024. The drive assembly 1020 also includes a pair of bell cranks 1026 connecting the drive bar 1022 and the couplings 1024. The bell cranks 1026 translate longitudinal movement of the drive bar 1022 to transverse movement of the couplings 1024. Each of the couplings 1024 is configured to engage a connector 1028, such as a rod or a cable. The connector 1028 may in turn be engaged with a latch mechanism, such that retraction of the connector 1028 actuates the latch mechanism. For example, the upper coupling 1024 may be connected to a top latch mechanism via the upper connector 1028, and the lower coupling 1024 may be connected to a bottom latch mechanism via the lower connector 1028.

The drive assembly 1020 has an extended state and a retracted state, and is biased toward the extended state, for example by a spring such as the spring 128. As the pushbar is moved toward the retracted position, the drive bar 1022 retracts, thereby pivoting the bell cranks 1026, retracting the couplings 1024 and connectors 1028, and actuating the latch mechanisms.

The force adjustment mechanism 1100 includes one or more tension springs 1110 urging the drive assembly 1020 toward the retracted state. In the illustrated form, each tension spring 1110 is stretched between one of the couplings 1024 and a casing 1002 of the exit device. As a result, the tension springs 1110 provide a retractive force urging the drive assembly 1020 in the retracting direction. The retractive force provided by the springs 1110 partially counteracts the extensive biasing force urging the drive assembly 1020 toward the extended state, thereby detracting from the net biasing force. As a result, the net resistive force resisting movement of the pushbar from the extended position toward the retracted position in reduced.

In order to adjust the net resistive force, one or both of the tension springs 1110 may be added to or removed from the exit device 1000, or may be replaced with an extension spring having a different spring constant. For example, removing one of the springs 1110 or replacing the springs 1110 with springs having a lower spring constant will reduce the retractive force provided by the force adjustment mechanism 1100. As a result, the net biasing force and net resistive force will be increased. In contrast, adding one or more springs 1110 to an exit device which does not include the counterbalance springs 1110 will increase the retractive force provided by the force adjustment mechanism 1100, thereby decreasing the net biasing force and net resistive force.

Certain embodiments may include a method of operating an exit device including a pushbar and a first spring, wherein the exit device resists movement of the pushbar from an extended position with a net resistive force, and the first spring contributes to the net resistive force. The method may comprise comparing an actual value of the net resistive force to a target net resistive force, and operating a force adjustment mechanism to adjust the actual value to the target net resistive force. The target net resistive force may be a net resistive force target value or may be a range of net resistive force target values.

In certain forms, the force adjustment mechanism may include a sleeve having a first position and a second position, wherein the first spring has a first deformation displacement in response to the first position of the sleeve and a second deformation in response to the second position of the sleeve, and the operating the force adjustment mechanism includes placing the sleeve in one of the first position and the second position.

In other forms, the force adjustment mechanism may include a second spring exerting a biasing force, the net resistive force may include the biasing force of the second spring, and the operating the force adjustment mechanism may include adjusting a deformation displacement of the second spring. The biasing force of the second spring may be an extensive biasing force contributing to the net resistive force, or a retractive force detracting from the net resistive force.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device configured for mounting to a door, the exit device comprising:

a mounting assembly configured for mounting to an external surface of the door;

a drive assembly movably mounted to the mounting assembly, the drive assembly comprising:

a pushbar having an extended position and a retracted position;

wherein the drive assembly has an extended state in which the pushbar is in the extended position, and wherein the drive assembly has a retracted state in which the pushbar is in the retracted position; and wherein the drive assembly in the extended state is configured to resist movement of the pushbar from the extended position to the retracted position with a net resistive force;

a first spring engaged between the mounting assembly and the drive assembly and urging the drive assembly toward the extended state with an extensive biasing force, the extensive biasing force contributing to the net resistive force; and a force adjustment mechanism operable to adjust the net resistive force, wherein the force adjustment mechanism has a first state and a second state;

wherein, with the exit device mounted to the door, the first spring is external to the door;

wherein, with the drive assembly in the extended state and the force adjustment mechanism in the first state, the net resistive force resisting movement of the pushbar from the extended position to the retracted position has a first net resistive force value; and wherein, with the drive assembly in the extended state and the force adjustment mechanism in the second state, the net resistive force resisting movement of the pushbar from the extended position to the retracted position has a second net resistive force value different from the first net resistive force value.

2. The exit device of claim 1, wherein the force adjustment mechanism is operable to adjust the extensive biasing force.

3. The exit device of claim 2, wherein the force adjustment mechanism comprises means for adjusting the extensive biasing force of the first spring.

4. The exit device of claim 2, wherein the first spring is a preloaded compression spring, and wherein the force adjustment mechanism comprises a removable spacer operable to adjust a compression displacement of the compression spring.

5. The exit device of claim 1, wherein the force adjustment mechanism comprises:
- a counterbalance spring exerting a retractive force detracting from the net resistive force; and
- means for adjusting the retractive force exerted by the counterbalance spring.

6. The exit device of claim 1, further comprising:
- a base plate extending in a longitudinal direction;
- a mounting bracket mounted on the base plate and extending in a lateral direction; and
- a collar coupled to a drive bar of the drive assembly, wherein the first spring exerts the extensive biasing force on the drive bar through the collar; and
- wherein the drive assembly further comprises a bell crank pivotally mounted on the mounting bracket and configured to translate lateral movement of the pushbar to longitudinal movement of the drive bar.

7. The exit device of claim 6, wherein the force adjustment mechanism comprises a torsion spring and an anchor plate;
- wherein the torsion spring includes a first arm engaged with the drive assembly and a second arm engaged with the anchor plate, the first arm exerting an adjustable biasing force on the drive assembly; and
- wherein the anchor plate includes a plurality of flanges, and the second arm is selectively engageable with each of the plurality of flanges to adjust the biasing force exerted by the first arm.

8. The exit device of claim 7, further comprising a pin pivotably coupling the bell crank to the mounting bracket; and
- wherein the torsion spring further comprises a coiled portion wrapped about the pin, and the first arm is engaged with the bell crank of the drive assembly.

9. The exit device of claim 8, wherein the anchor plate is mounted on the mounting bracket, and the biasing force exerted by the first arm is a second extensive biasing force contributing to the net resistive force.

10. The exit device of claim 8, wherein the anchor plate is mounted on the mounting bracket, and the biasing force exerted by the first arm is a retractive biasing force detracting from the net resistive force.

11. The exit device of claim 6, wherein the force adjustment mechanism includes the collar and a sleeve engaged with the first spring;
- wherein the sleeve has a first sleeve position in which the sleeve compresses the first spring by a first compression displacement, and the extensive biasing force has a first value; and
- wherein the sleeve has a second sleeve position in which the sleeve compresses the first spring by a second compression displacement, and the extensive biasing force has a second value.

12. The exit device of claim 11, wherein the sleeve includes a protrusion, the collar including a first channel and a second channel, and wherein each of the first channel and the second channel is sized and configured to receive the protrusion; and
- wherein the first channel receives the protrusion with the sleeve in the first sleeve position, and wherein the second channel receives the protrusion with the sleeve in the second sleeve position.

13. The exit device of claim 11, wherein the force adjustment mechanism further comprises a spline mounted on the collar, the spline having a first spline position and a second spline position;
- wherein the sleeve is threadedly engaged with the collar and includes a first longitudinal slot;
- wherein, with the sleeve in the first sleeve position and the spline in the first spline position, the spline is received in the first longitudinal slot and prevents rotation of the sleeve toward the second sleeve position; and
- wherein, with the sleeve in the first sleeve position and the spline in the second spline position, the spline in not received in the first longitudinal slot and permits rotation of the sleeve toward the second sleeve position.

14. The exit device of claim 13, wherein the sleeve further includes a second longitudinal slot;
- wherein, with the sleeve in the second sleeve position and the spline in the first spline position, the spline is received in the second longitudinal slot and prevents rotation of the sleeve toward the first sleeve position; and
- wherein, with the sleeve in the second sleeve position and the spline in the second spline position, the spline is not received in the second longitudinal slot and permits rotation of the sleeve toward the first sleeve position.

15. The exit device of claim 6, wherein the force adjustment mechanism comprises an extension spring exerting a biasing force on the collar; and
- wherein the force adjustment mechanism has a first configuration in which the extension spring is stretched between the collar and the mounting bracket, and wherein the biasing force comprises one of a retractive biasing force detracting from the net resistive force and a second extensive biasing force contributing to the net resistive force.

16. The exit device of claim 6, wherein the mounting bracket is a proximal mounting bracket positioned on a proximal side of the collar, the exit device further comprising a distal mounting bracket positioned on a distal side of the collar;
- wherein the force adjustment mechanism includes a tension spring including a first end engaged with the collar and a second end selectively engageable with each of the proximal mounting bracket and the distal mounting bracket to adjust the net resistive force;
- wherein the force adjustment mechanism has a first configuration in which the second end is engaged with the distal mounting bracket, and wherein the tension spring exerts a retractive biasing force detracting from the net resistive force; and
- wherein the force adjustment mechanism has a second configuration in which the second end is engaged with the proximal mounting bracket, and wherein the tension spring exerts a second extensive biasing force contributing to the net resistive force.

17. An exit device, comprising:
- a mounting assembly configured for mounting to a door;
- a drive assembly movably mounted to the mounting assembly, the drive assembly comprising:
  - a drive bar having an extended drive bar position and a retracted drive bar position; and
  - a pushbar operably connected to the drive bar, the pushbar having an extended pushbar position and a retracted pushbar position;
  - wherein the drive assembly has an extended state in which the drive bar and the pushbar are in the extended positions thereof, and wherein the drive assembly has a retracted state in which the drive bar and the pushbar are in the retracted positions thereof; and wherein the drive assembly in the extended state is configured to resist movement of the pushbar from the extended pushbar position toward the retracted pushbar position with a net resistive force;

a first spring urging the drive assembly toward the extended state with an extensive biasing force, the extensive biasing force contributing to the net resistive force; and a force adjustment mechanism operable to adjust the net resistive force while the pushbar remains in the extended pushbar position;

wherein the force adjustment mechanism comprises a counterbalance spring urging the exit device toward the retracted state with a retractive biasing force detracting from the net resistive force, and wherein the force adjustment mechanism is operable to adjust the retractive biasing force;

wherein the counterbalance spring has a first end and an opposite second end; and wherein, during movement of the drive assembly between the extended state and the retracted state, the first end remains in a fixed location relative to the mounting assembly, and the second end moves relative to the mounting assembly.

18. The exit device of claim 17, wherein the force adjustment mechanism further comprises means for adjusting the retractive biasing force exerted by the counterbalance spring.

19. An exit device, comprising:

a mounting assembly configured for mounting to an external surface of a door to thereby provide a mounting space external to the door;

a drive assembly mounted to the mounting assembly for movement between a retracted state and an extended state, the drive assembly comprising:

a manually operable pushbar having a retracted position in the retracted state of the drive assembly and an extended position in the extended state of the drive assembly, wherein with the drive assembly in the extended state, the pushbar resists movement from the extended position toward the retracted position with a net resistive force; and a first spring positioned in the mounting space and urging the drive assembly toward the extended state with an extensive force, the extensive force contributing to the net resistive force; and a force adjustment mechanism operable to adjust the net resistive force, the force adjustment mechanism having a first configuration in which the net resistive force comprises a first value when the pushbar is in the extended position, and a second configuration in which the net resistive force comprises a second value when the pushbar is in the extended position, wherein the second value is less than the first value.

20. The exit device of claim 19, wherein the force adjustment mechanism further has a third configuration in which the net resistive force comprises a third value between the first and second values.

21. The exit device of claim 19, wherein the force adjustment mechanism comprises a counterbalance spring urging the drive assembly toward the retracted state with a retractive force detracting from the net resistive force, and the force adjustment mechanism is operable to adjust the net resistive force from the first value to the second value by increasing the retractive force provided by the counterbalance spring.

22. The exit device of claim 19, wherein the force adjustment mechanism is operable to adjust the net resistive force from the first value to the second value by decreasing the extensive force provided by the first spring.

23. The exit device of claim 19, wherein the second value of the net resistive force is five pounds (5 lbf) or less.

24. The exit device of claim 19, wherein the mounting assembly further comprises a mounting bracket, and wherein the drive assembly further comprises:

a drive bar operably connected with a latchbolt; and a bell crank pivotably mounted on the mounting bracket and drivingly coupling the pushbar to the drive bar;

wherein the force adjustment mechanism comprises:

a housing mounted on the mounting bracket;

an adjustment bolt rotatably supported by the housing;

a sleeve supported by the adjustment bolt, the sleeve including an enlarged portion;

a link operably coupled with the drive assembly; and a counterbalance spring supported by the sleeve and compressed between the link and the enlarged portion of the sleeve, the counterbalance spring exerting a retractive biasing force on the drive assembly through the link, the retractive biasing force detracting from the net resistive force;

wherein the sleeve is threadedly engaged with the adjustment bolt and is configured to move longitudinally in response to rotation of the adjustment bolt, thereby adjusting a compression of the counterbalance spring; and wherein the force adjustment mechanism is configured to transition between the first and second configurations in response to rotation of the adjustment bolt.

25. The exit device of claim 24, wherein the enlarged portion of the sleeve includes a flat portion engaged with the housing and preventing rotation of the sleeve.

26. The exit device of claim 19, further comprising a latchbolt operably connected with the drive assembly, the latchbolt having a first position in response to the retracted state of the drive assembly and a second position in response to the extended state of the drive assembly.

* * * * *